(12) United States Patent
Greiner et al.

(10) Patent No.: US 6,993,223 B2
(45) Date of Patent: Jan. 31, 2006

(54) MULTIPLE DISTRIBUTED OPTICAL STRUCTURES IN A SINGLE OPTICAL ELEMENT

(75) Inventors: Christoph M. Greiner, Eugene, OR (US); Dmitri Iazikov, Springfield, OR (US); Thomas W. Mossberg, Eugene, OR (US)

(73) Assignee: LightSmyth Technologies, Inc., Eugene, OR (US)

( * ) Notice: Subject to any disclaimer, the term of this patent is extended or adjusted under 35 U.S.C. 154(b) by 0 days.

(21) Appl. No.: 10/998,185

(22) Filed: Nov. 26, 2004

(65) Prior Publication Data

US 2005/0135747 A1 Jun. 23, 2005

Related U.S. Application Data

(63) Continuation-in-part of application No. 10/653,876, filed on Sep. 2, 2003, now Pat. No. 6,829,417, which is a continuation-in-part of application No. 10/229,444, filed on Aug. 27, 2002, now Pat. No. 6,678,429, and a continuation-in-part of application No. 09/811,081, filed on Mar. 16, 2001, now Pat. No. 6,879,441.

(60) Provisional application No. 60/604,473, filed on Aug. 24, 2004, provisional application No. 60/586,866, filed on Jul. 8, 2004, provisional application No. 60/525,815, filed on Nov. 28, 2003, provisional application No. 60/370,182, filed on Apr. 4, 2002, provisional application No. 60/315,302, filed on Aug. 27, 2001, provisional application No. 60/247,231, filed on Nov. 10, 2000, provisional application No. 60/235,330, filed on Sep. 26, 2000, provisional application No. 60/199,790, filed on Apr. 26, 2000, provisional application No. 60/190,126, filed on Mar. 16, 2000.

(51) Int. Cl.
  *G02B 6/34* (2006.01)
(52) U.S. Cl. .............................. 385/37; 385/3; 385/10; 385/14
(58) Field of Classification Search .................. 385/1, 385/3, 8–10, 14, 36, 37, 123, 569, 570, 576; 359/565, 566
  See application file for complete search history.

(56) References Cited

U.S. PATENT DOCUMENTS

| | | | | |
|---|---|---|---|---|
| 6,678,429 B2 * | 1/2004 | Mossberg et al. | ............. | 385/10 |
| 6,829,417 B2 * | 12/2004 | Greiner et al. | ................ | 385/37 |
| 6,879,441 B1 * | 4/2005 | Mossberg | ................... | 359/569 |

* cited by examiner

Primary Examiner—Phan T. H. Palmer
(74) Attorney, Agent, or Firm—David S. Alavi

(57) ABSTRACT

An optical apparatus comprises an optical element having at least two sets of diffractive elements, each diffractive element comprising at least one diffracting region thereof. At least one diffractive element set collectively routes, between a corresponding input optical port and a corresponding output optical port, at least a portion of a corresponding optical signal incident on the diffracting regions that is diffracted thereby as it propagates from the corresponding input optical port. The optical element includes at least one spatial region thereof wherein multiple diffracting regions of a first diffractive element set are present and diffracting regions of a second diffractive element set are absent. The diffractive elements of each set, the diffracting regions thereof, and each said spatial region are arranged so as to impart desired spatial characteristics, desired spectral characteristics, or desired temporal characteristics onto the corresponding routed portion of the optical signal.

28 Claims, 19 Drawing Sheets

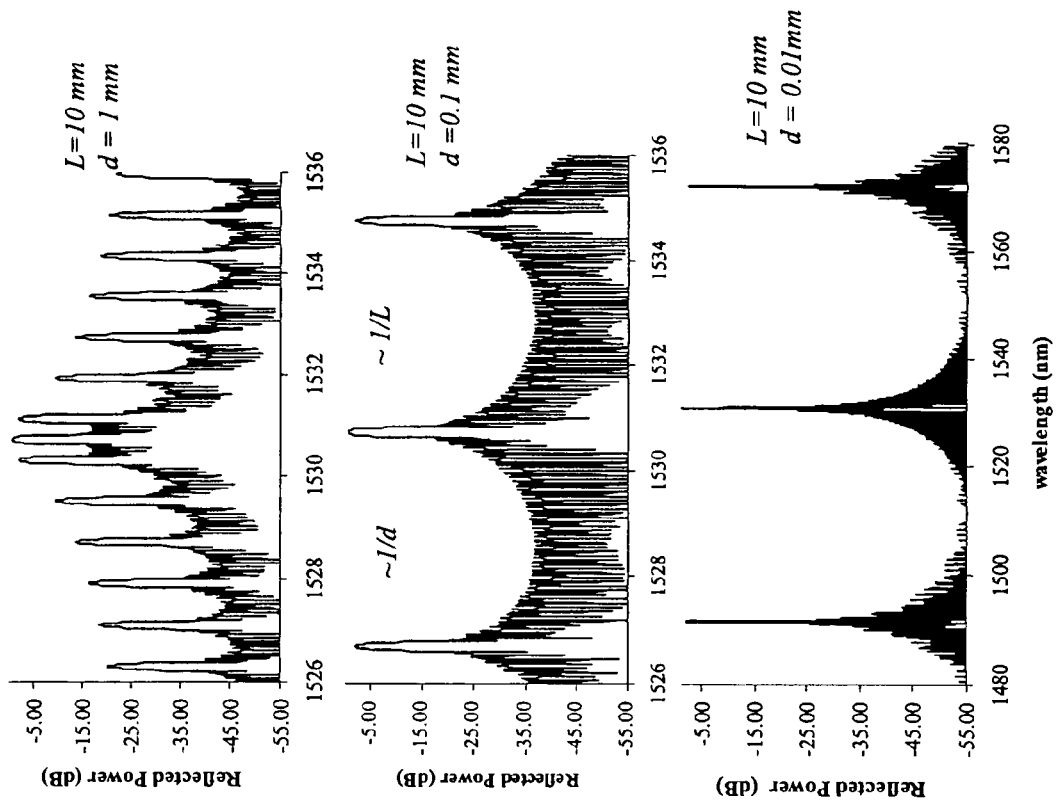
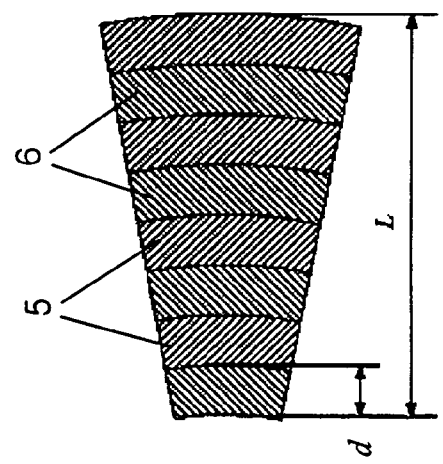
Figure 1
Figure 2

MULTIPLE DISTRIBUTED OPTICAL STRUCTURES IN A SINGLE OPTICAL ELEMENT

BENEFIT CLAIMS TO RELATED APPLICATIONS

This application claims benefit of: i) prior-filed now abandoned provisional App. No. 60/525,815 filed Nov. 28, 2003 in the names of Dmitri Iazikov, Christoph M. Greiner, and Thomas W. Mossberg; ii) prior-filed now abandoned provisional App. No. 60/586,866 filed Jul. 8, 2004 in the names of Dmitri Iazikov, Christoph M. Greiner, and Thomas W. Mossberg; and iii) prior-filed now abandoned provisional App. No. 60/604,473 filed Aug. 24, 2004 in the names of Dmitri Iazikov, Christoph M. Greiner, and Thomas W. Mossberg. Each of said App. Nos. 60/525,815, 60/586,866, and 60/604,473 is hereby incorporated by reference as if fully set forth herein.

This application is a continuation-in-part of prior-filed now abandoned U.S. non-provisional application Ser. No. 10/653,876 filed Sep. 2, 2003 now U.S. Pat. No. 6,829,417 in the names of Christoph M. Greiner, Dmitri Iazikov, and Thomas W. Mossberg, which is in turn a continuation-in-part of U.S. non-provisional application Ser. No. 10/229,444 filed Aug. 27, 2002 in the names of Thomas W. Mossberg and Christoph M. Greiner (now U.S. Pat. No. 6,678,429 issued Jan. 13, 2004), which in turn claims benefit of: i) provisional App. No. 60/315,302 filed Aug. 27, 2001 in the name of Thomas W. Mossberg; and ii) provisional App. No. 60/370,182 filed Apr. 4, 2002 in the names of Thomas W. Mossberg and Christoph M. Greiner. Each of said application Ser. Nos. 10/653,876, 10/229,444, 60/315,302, and 60/370,182 are hereby incorporated by reference as if fully set forth herein.

This application is a continuation-in-part of prior-filed now abandoned non-provisional application Ser. No. 09/811,081 filed Mar. 16, 2001 now U.S. Pat. No. 6,879,441 in the name of Thomas W. Mossberg, which in turn claims benefit of: i) provisional App. No. 60/190,126 filed Mar. 16, 2000; ii) provisional App. No. 60/199,790 filed Apr. 26, 2000; iii) provisional App. No. 60/235,330 filed Sep. 26, 2000; and iv) provisional App. No. 60/247,231 filed Nov. 10, 2000. Each of said application Ser. Nos. 09/811,081, 60/190,126, 60/199,790, 60/235,330, and 60/247,231 is hereby incorporated by reference as if fully set forth herein.

BACKGROUND

The field of the present invention relates to optical devices incorporating distributed optical structures. In particular, optical elements with multiple distributed optical structures are disclosed herein.

SUMMARY

An optical apparatus comprises an optical element having at least two sets of diffractive elements, each diffractive element comprising at least one diffracting region thereof. At least one diffractive element set collectively routes, between a corresponding input optical port and a corresponding output optical port, at least a portion of a corresponding optical signal incident on the diffracting regions that is diffracted thereby as it propagates from the corresponding input optical port. The optical element includes at least one spatial region thereof wherein multiple diffracting regions of a first diffractive element set are present and diffracting regions of a second diffractive element set are absent. The diffractive elements of each set, the diffracting regions thereof, and each said spatial region are arranged so as to impart desired spatial characteristics, desired spectral characteristics, or desired temporal characteristics onto the corresponding routed portion of the optical signal.

The optical element may further include at least one spatial region thereof wherein multiple diffracting regions of the second diffractive element set are present and diffracting regions of the first diffractive element set are absent. The diffractive elements of each set, the diffracting regions thereof, and each said spatial region are arranged so as to impart desired spatial characteristics, desired spectral characteristics, or desired temporal characteristics onto the corresponding routed portion of the optical signal. The spatial regions may be positioned and arranged so that a given portion of a spatial wavefront of an incident optical signal is incident on: i) at least one of the spatial regions having diffracting regions of the first diffractive element set; or ii) on at least one of the spatial regions having diffracting regions of the second diffractive element set.

Objects and advantages pertaining to multiple diffractive element sets in an optical element may become apparent upon referring to the disclosed embodiments as illustrated in the drawings and disclosed in the following written description and/or claims.

BRIEF DESCRIPTION OF THE DRAWINGS

FIG. 1 illustrates schematically two diffractive element sets interleaved in an optical device.

FIG. 2 illustrates spectral features arising from the device of FIG. 1.

Figure 4:
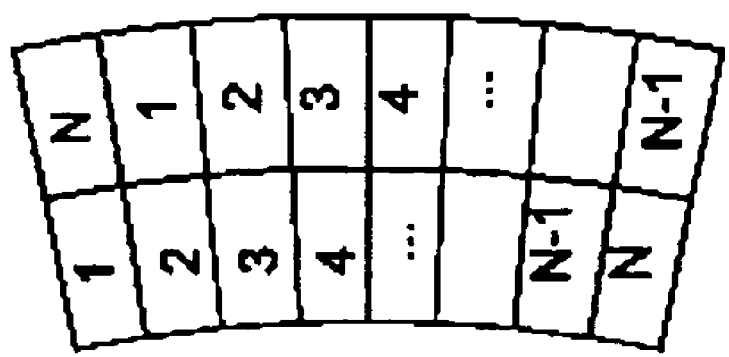
FIG. 4 illustrates schematically N diffractive element sets interleaved in an optical device.

In many of the Figures, spatial regions are shown that contain diffracting regions of diffractive element sets, but no individual diffractive elements or diffracting regions thereof are shown. The embodiments shown in the Figures are exemplary, and should not be construed as limiting the scope of the present disclosure and/or appended claims.

DETAILED DESCRIPTION OF EMBODIMENTS

An optical apparatus according to the present disclosure comprises an optical element having at least two sets of diffractive elements. The optical element may comprise a planar optical waveguide substantially confining in at least one transverse spatial dimension optical signals propagating therein, or may enable propagation of optical signals in three spatial dimensions therein.

A planar optical waveguide is generally formed on or from a substantially planar substrate of some sort. The confined optical signals typically propagate as transverse optical modes supported or guided by the planar waveguide. These optical modes are particular solutions of the electromagnetic field equations in the space occupied by the waveguide. The planar waveguide may comprise a slab waveguide (substantially confining in one transverse dimension an optical signal propagating in two dimensions therein), or may comprise a channel waveguide (substantially confining in two transverse dimension an optical signal propagating in one dimension therein). It should be noted that the term "planar waveguide" is not used consistently in the literature; for the purposes of the present disclosure and/or appended claims, the term "planar waveguide" is intended to encompass both slab and channel waveguides.

The planar waveguide typically comprises a core surrounded by lower-index cladding (often referred to as upper and lower cladding, or first and second cladding; these may or may not comprise the same materials). The core is fabricated using one or more dielectric materials substantially transparent over a desired operating wavelength range. In some instances one or both claddings may be vacuum, air, or other ambient atmosphere. More typically, one or both claddings comprise layers of dielectric material(s), with the cladding refractive indices $n_1$ and $n_2$ typically being smaller than the core refractive index $n_{core}$. (In some instances in which short optical paths are employed and some degree of optical loss can be tolerated, the cladding indices might be larger than the core index while still enabling the planar waveguide to support guided, albeit lossy, optical modes.) A planar waveguide may support one or more transverse modes, depending on the dimensions and refractive indices of the core and cladding. A wide range of material types may be employed for fabricating a planar waveguide, including but not limited to glasses, polymers, plastics, semiconductors, combinations thereof, and/or functional equivalents thereof. The planar waveguide may be secured to a substrate for facilitating manufacture, for mechanical support, and/or for other reasons. A planar waveguide typically supports or guides one or more optical modes characterized by their respective amplitude variations along the confined dimension.

The set of diffractive elements of the planar optical waveguide may also be referred to as: a set of holographic elements; a volume hologram; a distributed reflective element, distributed reflector, or distributed Bragg reflector (DBR); a Bragg reflective grating (BRG); a holographic Bragg reflector (HBR); a holographic optical processor (HOP); a programmed holographic structure (PHS); a directional photonic-bandgap structure; a mode-selective photonic crystal; or other equivalent terms of art. Each diffractive element of the set may comprise one or more diffracting regions thereof that diffract, reflect, scatter, route, or otherwise redirect portions of an incident optical signal (said process hereinafter simply referred to as diffraction). For a planar waveguide, the diffracting regions of each diffractive element of the set typically comprises some suitable alteration of the planar waveguide (ridge, groove, index modulation, density modulation, and so on), and is spatially defined with respect to a virtual one- or two-dimensional linear or curvilinear diffractive element contour, the curvilinear shape of the contour typically being configured to impart desired spatial characteristics onto the diffracted portion of the optical signal. For an optical element enabling propagation in three dimensions, the virtual diffractive element contour is an areal contour. Implementation of a diffractive element with respect to its virtual contour may be achieved in a variety of ways, including those disclosed in the references cited hereinabove. Each areal, linear, or curvilinear diffractive element is shaped to direct its diffracted portion of the optical signal to an output optical port. The relative spatial arrangement (e.g. longitudinal spacing) of the diffractive elements of the set, and the relative amplitude diffracted from each diffractive element of the set, yield desired spectral and/or temporal characteristics for the overall diffracted optical signal routed between the corresponding input and output optical ports. It should be noted that optical ports (input and/or output) may be defined structurally (for example, by an aperture, waveguide, fiber, lens, or other optical component) and/or functionally (for example, by a spatial location, convergence/divergence/collimation, and/or propagation direction). For a single-mode planar waveguide, such a set of diffractive elements may be arranged to yield an arbitrary spectral/temporal transfer function (in terms of amplitude and phase). In a multimode planar waveguide, modal dispersion and mode-to-mode coupling of diffracted portions of the optical signal may limit the range of spectral/temporal transfer functions that may be implemented.

The diffractive elements of the set (or equivalently, their corresponding contours) are spatially arranged with respect to one another so that the corresponding portions of the optical signal diffracted by each element interfere with one another at the output optical port, so as to impart desired spectral and/or temporal characteristics onto the portion of the optical signal collectively diffracted from the set of diffractive elements and routed between the input and output optical ports. The diffractive elements in the set are arranged so that an input optical signal, entering the planar waveguide through an input optical port, is successively incident on diffractive elements of the set. For the purposes of the present disclosure and/or appended claims, "successively incident" shall denote a situation wherein a wavevector at a given point on the wavefront of an optical signal (i.e., a wavefront-normal vector; sometimes referred to as a "portion" of the spatial wavefront) traces a path (i.e., a "ray path") through the diffractive element set that successively intersects the virtual contours of diffractive elements of the set. Such wavevectors at different points on the wavefront may intersect a given diffractive element virtual contour at the same time or at differing times; in either case the optical signal is considered "successively incident" on the diffractive elements. A fraction of the incident amplitude is diffracted by a diffractive element and the remainder transmitted and incident on another diffractive element, and so on successively through the set of diffractive elements. The diffractive elements may therefore be regarded as spaced substantially longitudinally along the propagation direction of the incident optical signal, and a given spatial portion of the wavefront of such a successively incident optical signal therefore interacts with many diffractive elements of the set. (In contrast, the diffractive elements of a thin diffraction grating, e.g. the grating lines of a surface grating, may be regarded as spaced substantially transversely across the wavefront of a normally incident optical signal, and a given spatial portion of the wavefront of such a signal therefore interacts with only one or at most a few adjacent diffractive elements).

As set forth hereinbelow, diffracting regions of a diffractive element set may be distributed over one of more spatial regions of the optical element, for facilitating placement of multiple diffractive element sets in a single optical element. These spatial regions may be positioned and arranged so as to impart desired spatial, spectral, or temporal characteristics onto the corresponding routed portions of in incident optical signal. Such arrangement may include an optical signal being successively incident on multiple spatial regions of a diffractive element set, with "successively incident" defined as set forth hereinabove. The word "primitive" may be used to designate one diffractive element set among multiple diffractive element sets in a single optical element (e.g., a single optical device may include multiple "primitive programmed holographic structures").

The set of diffractive elements provides dual functionality, spatially routing an optical signal between an input optical port and an output optical port, while at the same time acting to impart a spectral/temporal transfer function onto the diffracted portion of an input optical signal to yield an output optical signal. The diffractive elements may be designed (by computer generation, for example) so as to provide optimal routing, imaging, or focusing of the optical signal between an input optical port and a desired output optical port, thus reducing or minimizing insertion loss. Simple areal, linear, or curvilinear diffractive elements (segments of circles, spheres, ellipses, ellipsoids, parabolas, paraboloids, hyperbolas, hyperboloids, and so forth), if not optimal, may be employed as approximations of fully optimized contours. A wide range of fabrication techniques may be employed for forming the diffractive element set, and any suitable technique(s) may be employed while remaining within the scope of the present disclosure and/or appended claims. Particular attention is called to design and fabrication techniques disclosed in the references cited hereinabove. The following are exemplary only, and are not intended to be exhaustive.

Diffractive elements may be formed lithographically on the surface of a planar optical waveguide, or at one or both interfaces between core and cladding of a planar optical waveguide. Diffractive elements may be formed lithographically in the interior of the core layer and/or a cladding layer of the planar optical waveguide using one or more spatial lithography steps performed after an initial partial deposition of layer material. Diffractive elements may be formed in the core and/or cladding layers by projecting ultraviolet light or other suitable radiation through an amplitude and/or phase mask so as to create an interference pattern within the planar waveguide (fabricated at least in part with suitably sensitive material) whose fringe contours match the desired diffractive element contours. Alteration of the refractive index by exposure to ultraviolet or other radiation results in index-modulated diffractive elements. The mask may be zeroth-order-suppressed according to methods known in the art, including the arts associated with fabrication of fiber Bragg gratings. The amplitude and/or phase mask may be produced lithographically via laser writer or e-beam, it may be interferometrically formed, or it may be formed by any other suitable technique. In instances where resolution is insufficient to produce a mask having required feature sizes, a larger scale mask may be produced and reduced to needed dimensions via photoreduction lithography, as in a stepper, to produce a mask at the needed scale. Diffractive elements may be formed by molding, stamping, impressing, embossing, or other mechanical processes. A phase mask may be stamped onto the core or cladding surface followed by optical exposure to create diffractive elements throughout the core and or cladding region. The optical or UV source used to write the diffractive elements in this case should have a coherence length comparable or longer than the distance from the stamped phase mask to the bottom of the core region. Stamping of the phase mask directly on the device may simplify alignment of diffractive elements with ports or other device components especially when those components may be formed in the same or another stamping process. Many approaches to the creation of refractive index modulations or gratings are known in the art and may be employed in the fabrication of diffractive element sets.

Irradiation-produced refractive index modulations or variations for forming diffractive elements will optimally fall in a range between about $10^{-4}$ and about $10^{-1}$; however, refractive index modulations or variations outside this range may be employed as well. Refractive index modulations or variations may be introduced by light of any wavelength (including ultraviolet light) that produces the desired refractive index changes, provided only that the photosensitive material employed is suitably stable in the presence of light in the desired operating wavelength range of the spectral filter. Exposure of a complete set of diffractive elements to substantially spatially uniform, refractive-index-changing light may be employed to tune the operative wavelength range of the diffractive element set. Exposure of the diffractive element set to spatially non-uniform refractive-index changing light may be employed to chirp or otherwise wavelength-modulate the spectral filter (described further hereinbelow). The sensitivity of planar waveguide materials to irradiation produced refractive index modulations may be increased using hydrogen-loading, flame-brushing, boron or other chemical doping, or other method known in the art, for example in the context of making fiber Bragg gratings.

The curvilinear shape of the diffractive element contours may be determined by a variety of standard optical imaging system design tools. Essentially, each diffractive element contour may be optimized to image the input port onto the output port in a phase coherent manner. Inputs to the design are the detailed structure of the input and output optical ports and their locations. Standard ray tracing approaches to optical element design may provide a diffractive contour at each optical distance into the planar waveguide that will provide an optimal imaging of the input signal at the input port onto the optimal output signal at the output port. Simple curves may be employed as approximations of the fully optimized contours. Diffractive element virtual contours may be spaced by an optical path difference (as described above) that provides for the field image of successive diffractive contours to be substantially in phase at a desired wavelength. If the overall response of the diffractive element set is to be apodized with amplitude and/or phase modulation (to yield a desired spectral transfer function or impulse response function), the optical spacing of successive diffractive element contours may be controlled to provide required phase differences between diffracted components at the output port, and/or the diffractive strength of the elements may be individually controlled as well (as described in detail in the references cited hereinabove).

An alternative approach to designing the diffractive element contours for a diffractive element set is to calculate interference patterns between simulated fields at a desired wavelength and with desired waveforms entering the input port and exiting the output port. In forming or writing a summed pattern for the diffractive element set, suitable discretization is applied as needed for any lithographic or UV exposure approach that is utilized for fabrication. The holographic structure may be designed by interference of computer-generated beams having the desired computer-generated temporal waveforms, with the resulting calculated arrangement of diffractive elements implemented by lithography and/or other suitable spatially-selective fabrication techniques. For example, interference between a delta-function-like pulse and a desired reference optical waveform (or its time-reverse) may be calculated, and the resulting interference pattern used to fabricate a diffractive element set that acts to either recognize or generate the desired reference optical waveform.

In an alternative method for making the diffractive element structure, the optical element may include material of appropriate index that is also photosensitive at the wavelength of the desired operational signal beams. As in traditional holography, the input and output recording beams (same wavelength as operational signal beams of the envisioned device) are overlapped in the optical element and the interference pattern between them is recorded. Subsequently the photosensitive material is developed and, if necessary, a cladding may be deposited or attached by other means.

The phrase "operationally acceptable" appears herein describing levels of various performance parameters of planar waveguides and diffractive element sets thereof. Such parameters may include optical coupling coefficient (equivalently, optical coupling efficiency), diffraction efficiency, undesirable optical mode coupling, optical loss, and so on. An operationally acceptable level may be determined by any relevant set or subset of applicable constraints and/or requirements arising from the performance, fabrication, device yield, assembly, testing, availability, cost, supply, demand, and/or other factors surrounding the manufacture, deployment, and/or use of a particular assembled optical device. Such "operationally acceptable" levels of such parameters may therefor vary within a given class of devices depending on such constraints and/or requirements. For example, a lower optical coupling efficiency may be an acceptable trade-off for achieving lower device fabrication costs in some instances, while higher optical coupling may be required in other instances in spite of higher fabrication costs. In another example, higher optical loss (due to scattering, absorption, undesirable optical coupling, and so on) may be an acceptable trade-off for achieving lower device fabrication cost or smaller device size in some instances, while lower optical loss may be required in other instances in spite of higher fabrication costs and/or larger device size. Many other examples of such trade-offs may be imagined. Optical devices and fabrication methods therefor as disclosed herein, and equivalents thereof, may therefore be implemented within tolerances of varying precision depending on such "operationally acceptable" constraints and/or requirements. Phrases such as "substantially adiabatic", "substantially spatial-mode-matched", "so as to substantially avoid undesirable optical coupling", and so on as used herein shall be construed in light of this notion of "operationally acceptable" performance.

As mentioned in above-cited U.S. application Ser. No. 09/811,081 now U.S. Pat. No. 6,879,441, a single optical apparatus may have multiple primitive sets of diffractive elements. These primitive diffractive element sets may occupy spatial regions in an optical element that are the same, are partially overlapping, or are substantially non-overlapping. More specifically, multiple primitive diffractive element sets may be: i) "stacked" (i.e., positioned one after another along an optical propagation direction from an input port of the optical element); ii) "interleaved" (i.e., the optical element has spatial regions containing diffracting regions of one primitive diffractive element set but no diffracting regions of another primitive diffractive element set; the various spatial regions containing the diffracting regions of a primitive diffractive element set may not be contiguous, but are coherent; the spatial regions may border on other spatial regions containing diffracting regions of other primitive diffractive element sets); iii) overlaid (i.e., the diffracting regions of multiple primitive diffractive element sets occupy a common spatial region); or iv) combined in a common optical element using a combination of these methods. It may be desirable to combine multiple primitive diffractive element sets to create an optical apparatus with multiple outputs and/or inputs, to more efficiently utilize device area, or to meet specific design requirements.

Overlaid primitive diffractive element sets are described in above-cited U.S. application Ser. Nos. 10/653,876, 10/229,444 now U.S. Pat. No. 6,678,429, 60/315,302, and 60/370,182. If the fill-factors of diffracting regions of the diffractive elements are sufficiently low (upon implementation of partial-fill grayscale or other apodization technique, for example, as described in the preceding references), then multiple primitive diffractive element sets may be formed in a common spatial region of an optical element with a low probability that diffracting regions of different primitive diffractive element sets would spatially overlap. Such overlap that would occur may be inconsequential, or may be eliminated to any desired degree by element-by-element movement of individual diffracting regions, if desired. At higher fill-factors, a more deterministic approach may be employed for ensuring that diffracting regions for the respective diffractive element sets do not spatially coincide. Depending on the fabrication technique, such considerations may not be necessary. For fabrication by binary lithography, two diffracting regions cannot overlap and function properly. A particular location of the optical element is either etched or not; an optical signal interacts at that location in the same way whether the location was etched to form a single diffracting region or multiple diffracting regions. Fabrication techniques wherein a material response is substantially linear, such as forming diffracting regions by photo-exposure or grayscale lithography, enable formation of diffracting regions that may spatially overlap while each properly fulfills its function. As long as the material response (to the fabrication technique) is substantially linear, a particular location of the optical element will interact differently with an optical signal according to whether it was exposed to form one diffracting regions, two diffracting regions, and so on. For such linear (i.e., grayscale) fabrication techniques, diffractive element sets may be overlaid without regard for fill factor.

Interleaving of multiple primitive diffractive element sets refers to individual primitive diffractive element sets that occupy inter-mixed but substantially non-overlapping spatial regions of an optical element. Interleaving may be used along with or without other variations of implementing diffracting regions of the diffractive elements (including partial-fill, width-based, line-density, facet-displacement, and element-displacement grayscale methods, other apodization techniques, and so forth). Multiple spatial regions for each of the primitive diffractive element sets may be thought of as forming a "patchwork" over the optical element. Stacking of primitive diffractive element sets might be regarded as the simplest example of interleaving (for which the descriptor "interleaving" may not necessarily even be appropriate), with each primitive diffractive element set occupying a single distinct spatial region of the optical element, and with the spatial regions arranged sequentially along a propagation direction of optical signals (i.e., "stacked"). An incident optical signal is successively incident on each spatial region, and therefore also on each primitive diffractive element set.

True interleaving (i.e., not stacking) may enable improved spectral resolution compared to an optical device of the same overall length with stacked primitive diffractive element sets. It should be noted that in the low to moderate reflection strength case, the spectral resolution $\Delta f_{res}$ (the spectral width of the main reflection maximum) of an unapodized primitive diffractive element set is inversely proportional to the maximal optical path length difference between interfering light beams diffracted by the various diffractive elements of the primitive set. If N primitive programmed holographic structures are stacked and occupy substantially equal portions of a total device length L, the resolution of each primitive diffractive element set is limited by the length L/N. If, on the other hand, N primitive diffractive element sets are each divided into multiple spatial regions, and the spatial regions interleaved so that regions of each primitive set are distributed along the entire length L of the optical element, then the resolution of each primitive diffractive element set would be limited by L. Spatial regions of each primitive diffractive element set may or may not extend across the entire transverse extent of the interleaved multiple diffractive element sets. It is assumed that the various spatial regions of the primitive diffractive element sets are coherent except for phase shifts introduced as part of an overall apodization.

Various adaptation are disclosed and/or claimed herein for reducing, minimizing, or substantially eliminating unwanted spatial or spectral characteristics from routed portions of an incident optical signal that may arise due to interleaving of multiple primitive diffractive element sets. These may be achieved by positioning and arranging the spatial regions occupied the primitive diffractive element sets or by control over the refractive index of the optical element as a function of position.

In the following discussion, the depth direction (i.e., propagation direction of an incident optical signal) refers to the direction normal to the phase front of the input beam, while the transverse direction refers to the direction along the phase front of the input beam (perpendicular to the input beam propagation direction). Note that these direction are defined locally for each portion of the spatial wavefront, which is generally curved.

Spatially periodic placement of spatial regions of primitive diffractive element sets along the propagation direction (as in FIG. 1, for example) typically produces additional maxima in the spectral transfer function (as shown in FIGS. 2A–2C, for example). The overall length of the optical device is L, and two primitive diffractive element sets 5 and 6 are periodically interleaved along the propagation direction, with each spatial region being of length d. The spectral separation $\Delta f$ between the additional spectral reflection maximum and the main spectral reflection maximum of such interleaved primitive diffractive element sets is inversely proportional to the optical path length between individual interleaved spatial regions along the propagation direction $d \times n_{eff}$, where $n_{eff}$ is average modal effective refractive index in the optical element (channel waveguide, slab waveguide, or other optical element). If such additional spectral characteristics are not desirable, d or $n_{eff}$ may be chosen so as to modify the optical path length, so that the undesirable spectral characteristics may lie substantially outside a desired operational spectral range for the optical apparatus (by controlling the optical pathlength $d \times n_{eff}$). Examples of the resulting reflection spectra for one of the primitive diffractive element sets are shown in FIGS. 2A–2C (note the differing wavelength scale in FIG. 2C). Alternatively, the magnitude of the undesirable spectral characteristics (e.g., secondary reflective maxima) may be reduced to an operationally acceptable level within the desired operational spectral range of the optical apparatus by distorting the spatial periodicity of the spatial regions of the primitive diffractive element sets (i.e., by making the arrangement of the spatial regions substantially aperiodic along the propagation direction).

Figure 3:
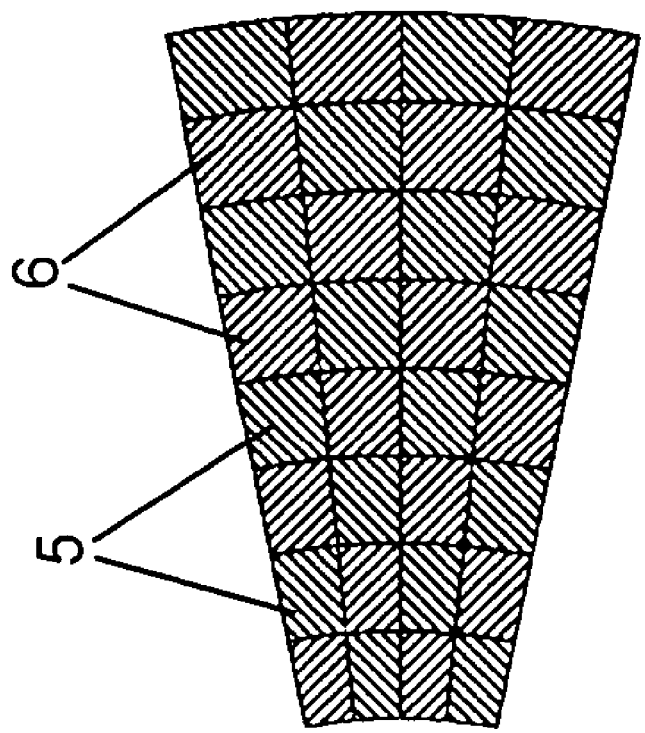
FIG. 3 illustrates schematically two diffractive element sets interleaved in an optical device.
Figure 5:
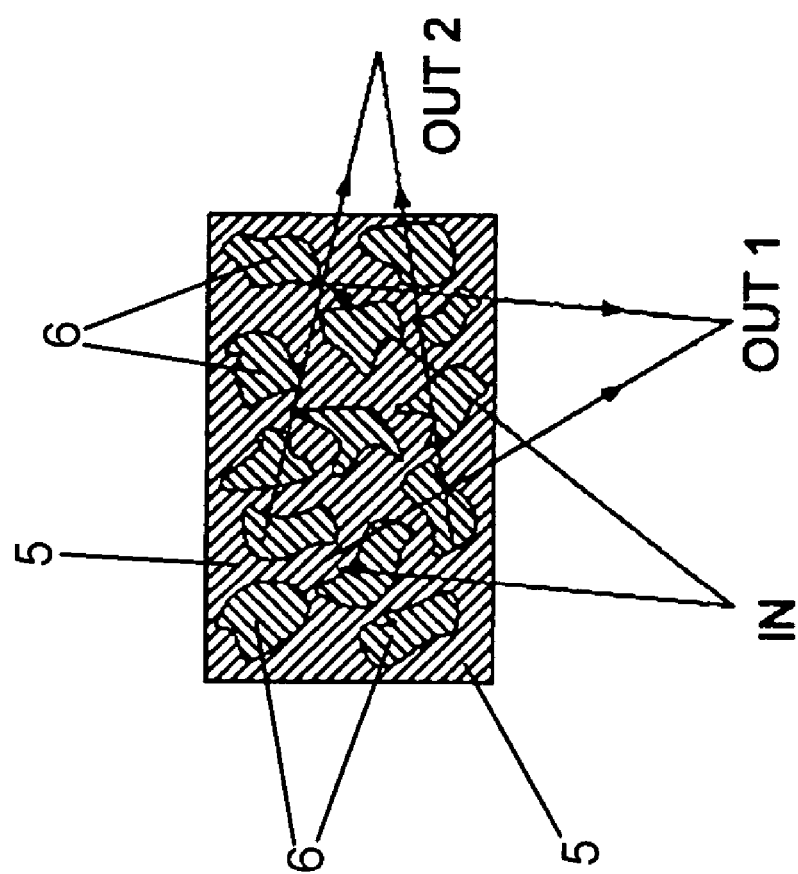
FIG. 5 illustrates schematically two diffractive element sets interleaved in an optical device.

It should be noted that changes in $n_{eff}$ induced by the presence of the multiple primitive diffractive element sets in the optical element must typically be accounted for. Such changes may arise from different fill factors, different diffractive orders or periods, and so forth, each of which may alter $n_{eff}$. Any desired apodization scheme may be implemented for an interleaved primitive diffractive element set. Other interleaving patterns for the spatial regions of the primitive diffractive element sets may also be employed, in addition to the simple periodic banded arrangement of FIG. 1. The exemplary embodiments of FIGS. 3 and 4 illustrate a checkerboard-type interleaving pattern for two primitive diffractive element sets (FIG. 3) and for N primitive diffractive element sets (FIG. 4). In FIG. 5, two primitive diffractive element sets are shown interleaved using a complex, irregular nested pattern. A nested pattern may be selected for consistency with desired spatial and spectral characteristics for the routed portions of incident optical signals. It should be noted that in none of the exemplary embodiments disclosed herein is it necessary that the interleaved spatial regions be space-filling. Gaps may be left between the spatial regions for a variety of reasons, which may include tailoring of the spatial, spectral, or temporal characteristics of a primitive diffractive element set. Diffraction theory allows for the calculation of spatial, spectral, and/or temporal transfer functions in the low reflectivity limit. Other calculational methods known in the art, particularly methods employed in the context of fiber gratings, may be employed to determine spatial, spectral, and/or temporal characteristics of the routed optical signals in a high reflectivity regime.

Figure 6:
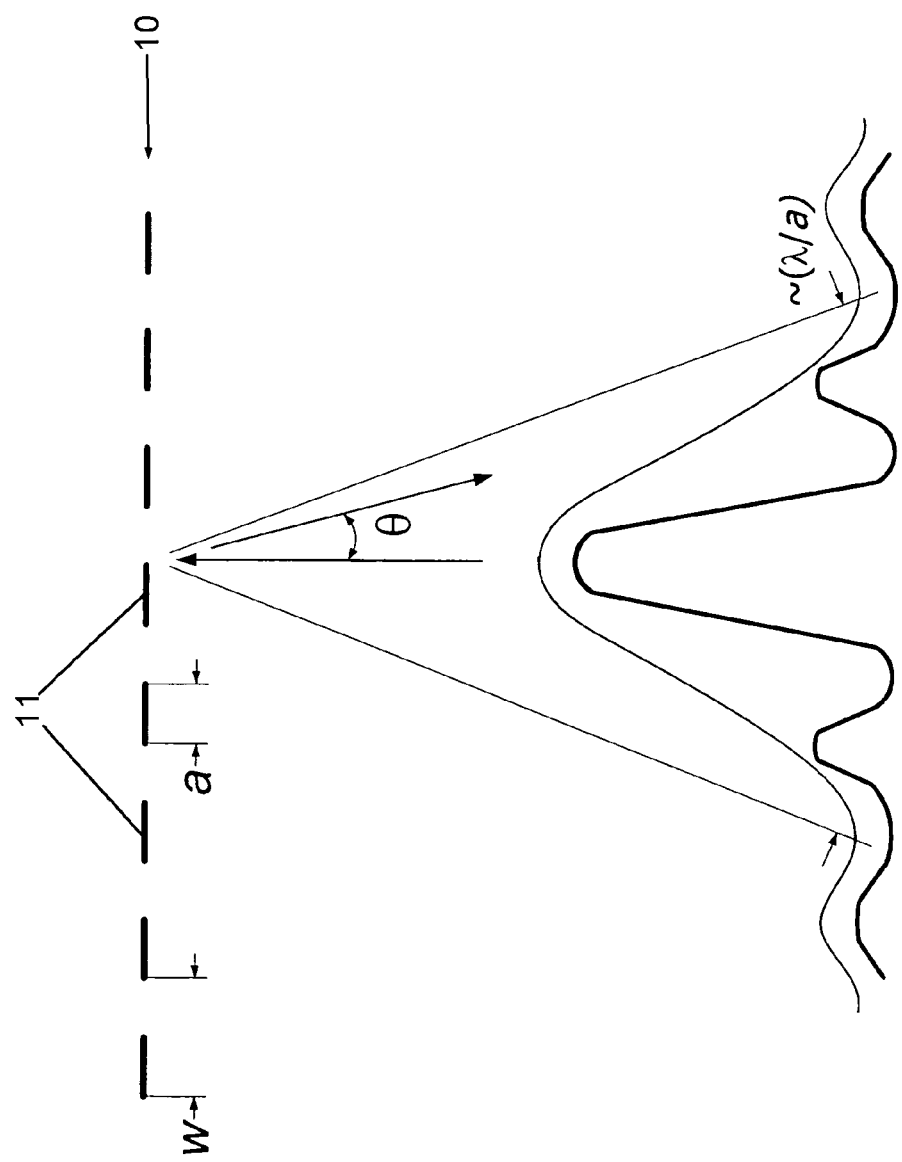
FIG. 6 illustrates schematically a diffractive element with diffractive regions, and the spatial distribution of an optical field diffracted therefrom.

When interleaving patterns are substantially periodic in the transverse direction (substantially perpendicular to the local propagation direction; substantially parallel to the local wavefront) as in the exemplary embodiment of FIG. 3, additional spatial diffractive maxima may appear in the portion of the optical signal routed by a primitive diffractive element set. Such undesirable spatial characteristics in the routed portion of the optical signal may be localized at certain output propagation angles, or may be spatially localized in some regions. Such unwanted diffractive optical signals may interfere with the desired output optical signal. The location and intensities of the additional maxima may be modeled using the theory of a thin diffraction grating (illustrated schematically in FIGS. 6–15). Specifically, as shown schematically in FIG. 6, for a thin reflective diffractive element 10 with diffracting regions 11 of width a and spatial period w, and normal incidence of light with wavelength $\lambda$, the direction $\theta$ to a spatial diffraction maxima is determined by formula $\sin(\theta)=m\lambda/w$, where $m=0, 1, 2$, etc and $\theta=0$ corresponds to the direction of the zero order diffraction signal. Most of the diffracted intensity is located within an envelope with angular width of approximately $\lambda/a$ (the diffractive angle from an individual diffracting region 11 of the diffractive element 10). This simple model mimics the behavior of a checkerboard type interleaving pattern, with the diffracting regions 11 of FIG. 6 acting in a manner similar to the transversely-periodically-arranged spatial regions 5 and 6 of the primitive diffractive element sets of the embodiment of FIG. 3. A more complete analysis of the diffractive maxima produced by the embodiment of FIG. 3, or by other transverse arrangements of spatial regions 5 and 6 of interleaved primitive diffractive element sets, may be readily performed by those skilled in the art.

The additional diffractive maxima arising from transverse interleaving may have various undesirable effects. If the position of an input or output port corresponding to one primitive diffractive element set overlaps an additional diffractive maximum of another primitive diffractive element set, the result would be increased optical cross-talk between the two primitive diffractive element sets. Also, optical power spatially routed to the additional diffractive maximum is not available to be routed to the intended diffractive maximum, thus reducing the device power efficiency (equivalently, increasing device insertion loss). The intensities of the additional diffracted spatial maxima may be reduced or substantially eliminated by substantially randomizing the transverse placement of the spatial regions of a primitive diffractive element set across the wavefront of the incident optical signal. Alternatively, the spatial region of a primitive diffractive element set may be positioned and arranged deterministically so as to reduce or substantially eliminate such undesirable spatial characteristics of the routed portion of the optical signal. In addition to varying the transverse spatial period of the placement of the spatial regions of the interleaved primitive diffractive element sets, the transverse extent of each spatial region may also be varied in order to reduce, eliminate, or spatially shift undesirable spatial characteristics of the routed portion of the optical signal (including additional spatial diffracted maxima).

The effect on spatial characteristics of the routed optical signal of such positioning and arrangement of the spatial regions of a primitive diffractive element set may be illustrated in the following simulated examples (FIGS. 7–15), in which diffracting regions 11 of diffractive elements 10 are arranged for similar reasons. The calculated behaviors for the diffractive element are analogous to those exhibited by spatial regions of primitive diffractive element sets analogously arranged. In these examples, the paraxial angle approximation is used for simplicity (i.e., the distance to the primitive diffractive element set from the corresponding input and output ports is much larger than the distance between the ports). Similar analysis with analogous results may be performed for the case of non-paraxial angles. The simulations of the spatial distribution of diffracted optical output power in the image plane are performed using numerical simulations based on the Huygens-Fresnel principle. Input and output optical power is calculated along the lines connecting the input and output ports. The following are exemplary only, and may be analogously performed for other diffractive element shapes and arrangements.

Figure 7:
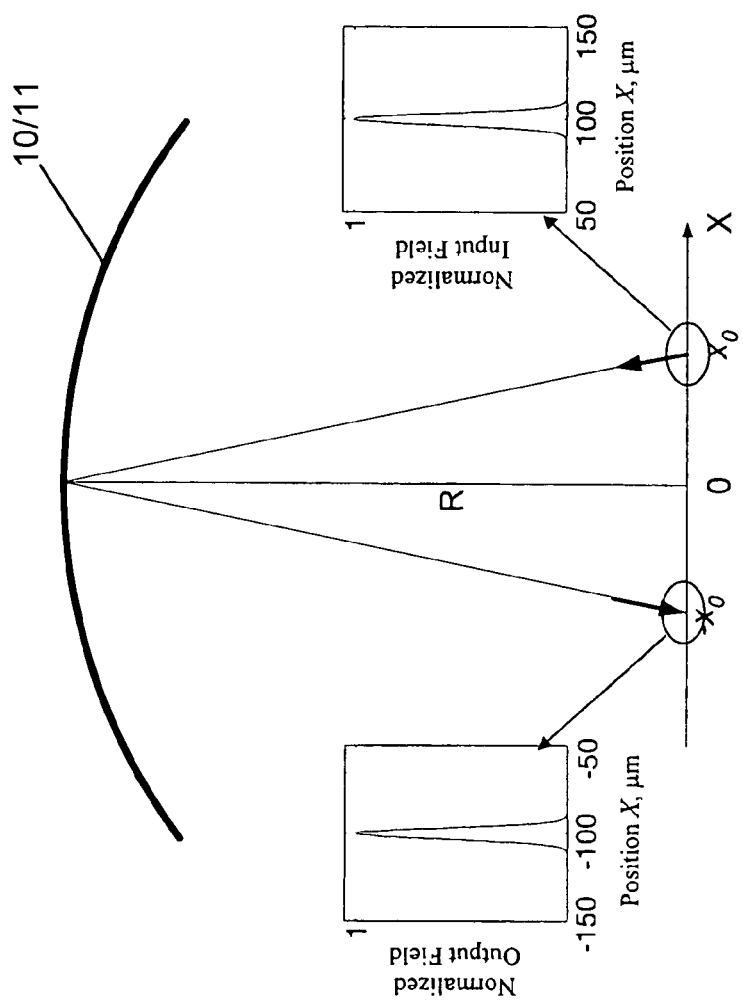
FIG. 7 illustrates schematically a diffractive element and the spatial distribution of an optical field diffracted therefrom.

In FIG. 7, an optical source of wavelength $\lambda$ with Gaussian distribution of field amplitude $A=A_0 \exp(-(x-x_0)^2/r^2)$ (where r is the mode field radius) is placed at an input port on the X-axis near the center of curvature of a single diffractive element 10. The center of curvature is located along the X-axis at $x=0$). The diffractive element 10 comprises a single diffracting region 11 and has a radius R. The portion of the incident optical signal routed by the diffractive element 10 arrives at an output port on the X-axis with an amplitude distribution of approximately the same Gaussian distribution of field amplitude $A=A_1 \exp(-(x+x_0)^2/r^2)$. The insets in FIG. 7 show the input field distribution and the resulting image (i.e. output) field distribution. In FIGS. 7 through 15, $r=6\,\mu m$, $R=4000\,\mu m$, $x_0=100\,\mu m$ and $A_0=A_1=1$ (i.e., all field distributions are normalized to unity peak amplitude).

Figure 8:
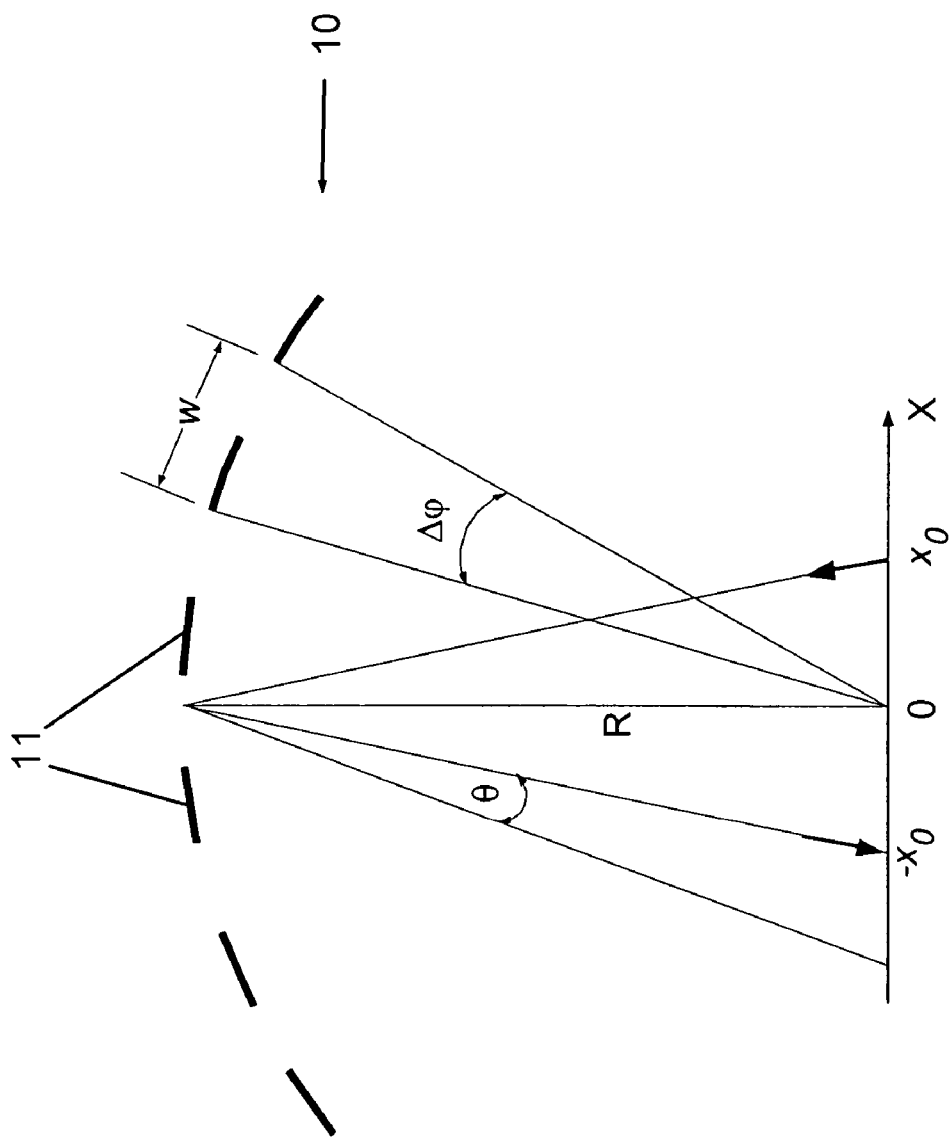
FIG. 8 illustrates schematically a diffractive element with diffractive regions.
Figure 9:
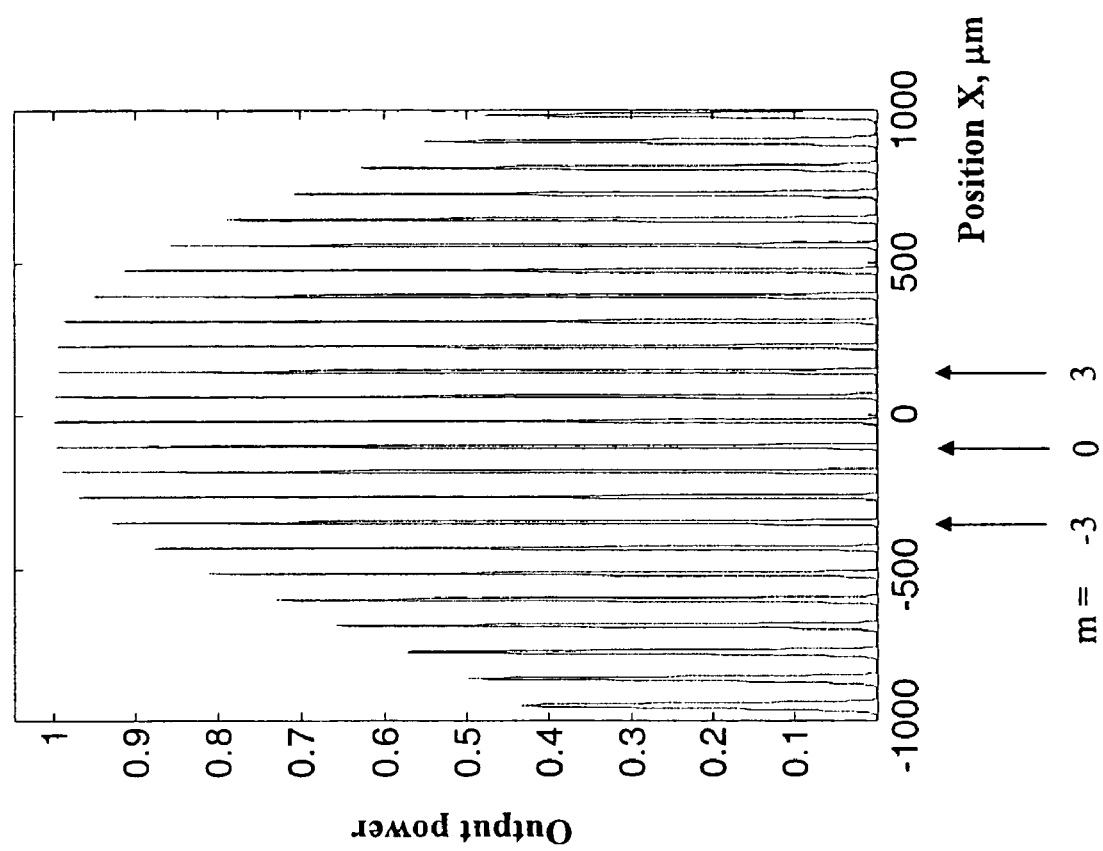
FIG. 9 illustrates schematically the spatial distribution of an optical field diffracted from the diffractive structure of FIG. 8.

In the example of FIG. 8, a diffractive element 10 of the same shape and position comprises multiple diffracting regions 11, each comprising a discrete arc segment with period w and arc length w/2. Additional diffracted spatial intensity maxima appear in the X-axis image plane (FIG. 9), which occur at angular positions given by $\sin(\theta)=\pm m\lambda/w$, $m=0, 1, 2\ldots$ The angular period of the reflective diffractive grating (in radians) is given by $\Delta\phi=w/R$. For illustrative purposes, the angular width of the element in the following examples it is set to be $\Delta\phi/2$. In FIG. 8 to 15, $w=50\,\mu m$ and $\Delta\phi=0.0125$ rad. In the image plane, the diffracted spatial maxima will be located at approximately $-x_0\pm R\sin(\theta(m))$, or equivalently at $-x_0\pm m\lambda/\Delta\phi$.

Figure 10:
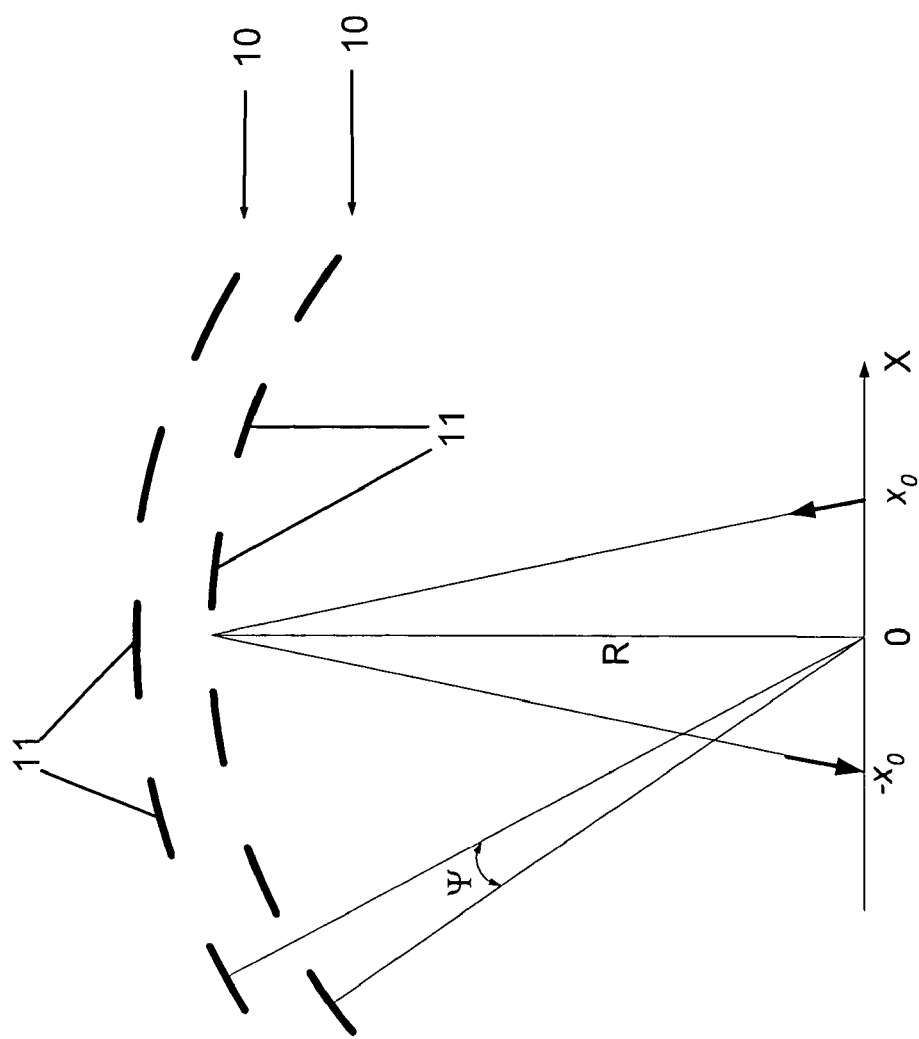
FIG. 10 illustrates schematically diffractive elements with diffractive regions.
Figure 11:
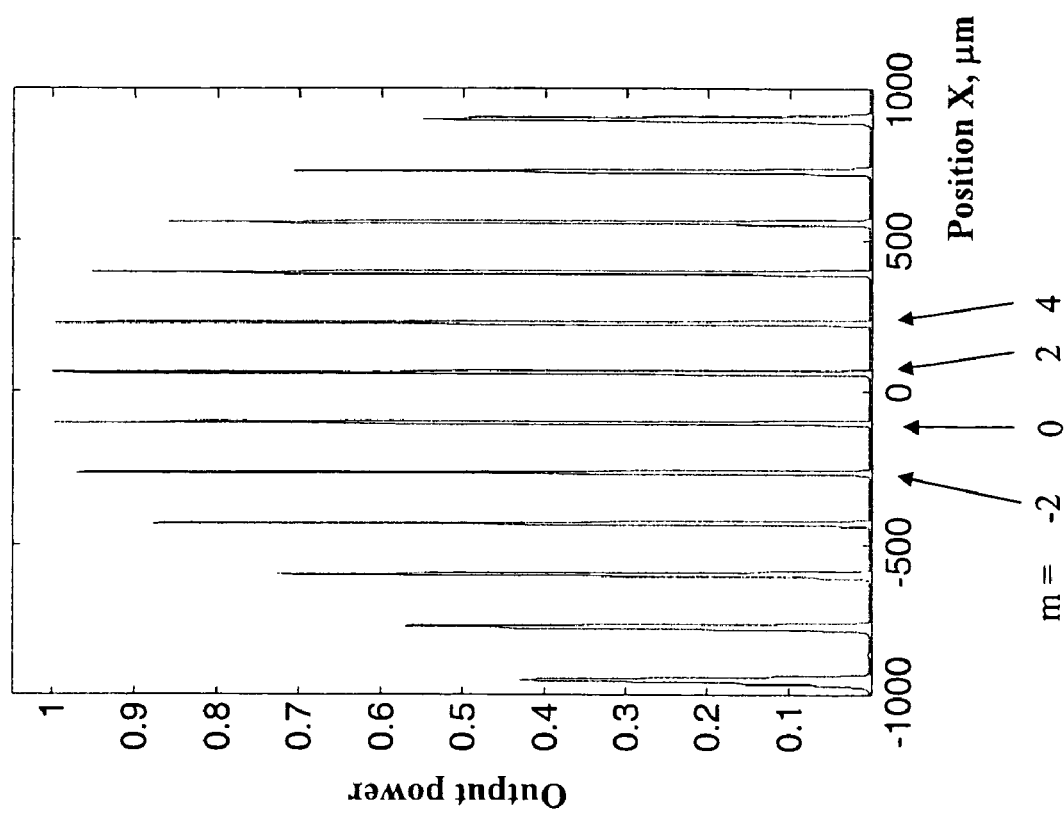
FIG. 11 illustrates schematically the spatial distribution of an optical field diffracted from the diffractive structure of FIG. 10.

In the example of FIG. 10, a second concentric diffractive element 10 comprising additional diffracting regions 11 is placed behind the first diffractive element. The second diffractive element has a larger radius, so that the optical path length difference between the first and the second diffractive elements for the optical signal routed between the input and output ports is multiple of $\lambda$. If the second diffractive element comprises discrete diffracting regions with the same angular period $\Delta\phi$ and angular width $\Delta\phi/2$, but the angular directions to the centers of the diffracting regions of the second diffractive element are shifted by $\Psi=\Delta\phi/2$ with respect to the angular directions to the centers of the diffracting regions of the first diffractive element, the portion of the optical signal routed by the two diffractive elements will have diffracted spatial maxima along X-axis at locations $-x_0\pm m\lambda/\Delta\phi$, where $m=0, \pm 2, \pm 4, \ldots$ (as shown in FIG. 11). In other words, the odd-numbered diffracted spatial maxima are substantially suppressed.

Figure 12:
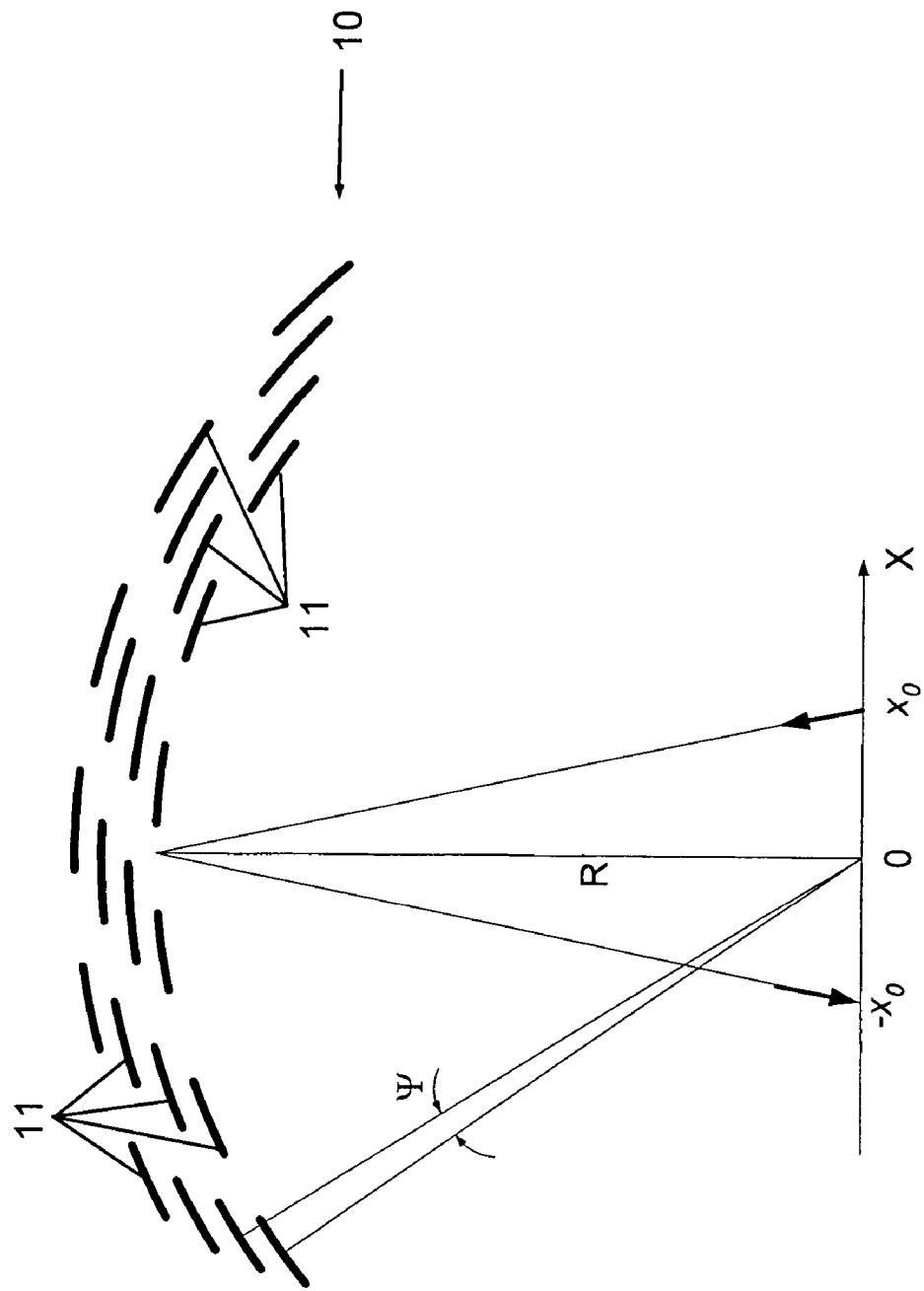
FIG. 12 illustrates schematically diffractive elements with diffractive regions.
Figure 13:
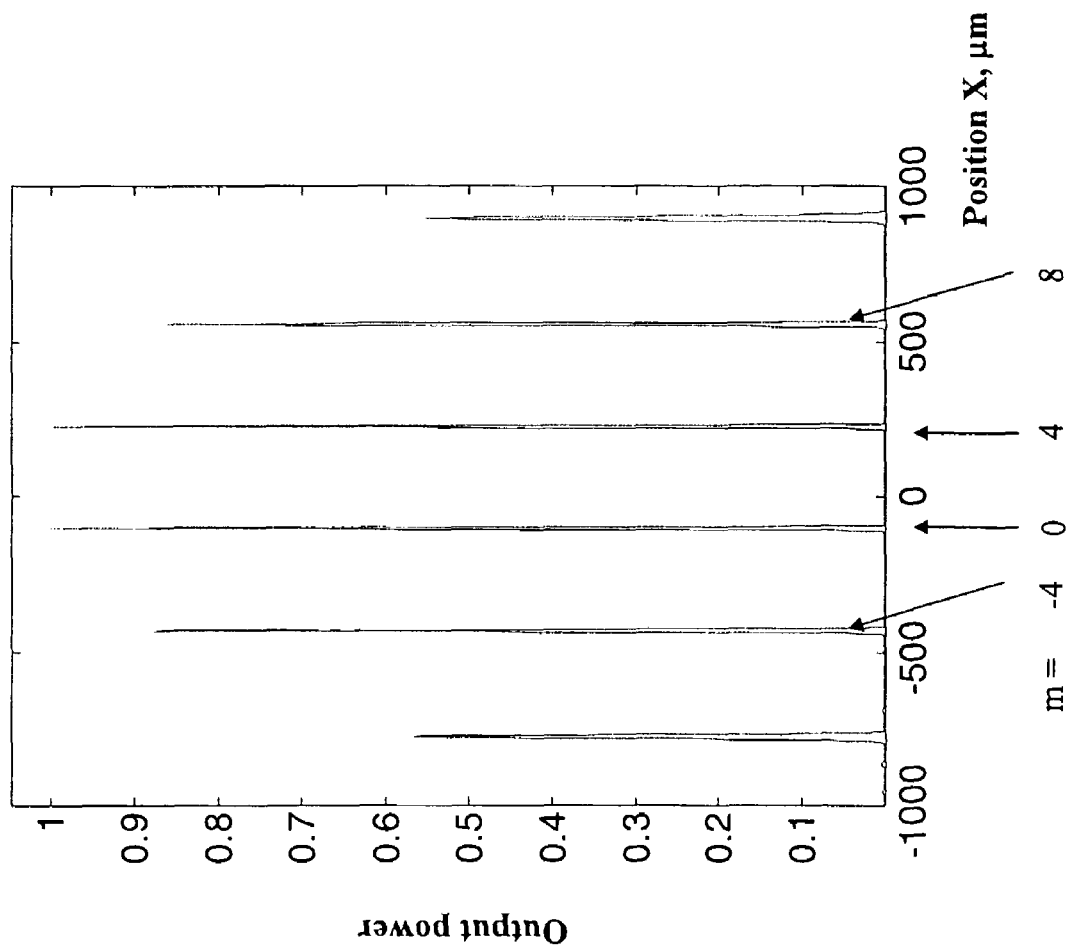
FIG. 13 illustrates schematically the spatial distribution of an optical field diffracted from the diffractive structure of FIG. 12.

In the example of FIG. 12, third and fourth concentric diffractive elements 10 comprising additional diffracting regions 11 are placed behind the second diffractive element 10, once again with larger radii so that the optical path length difference between the diffractive elements for the optical signal routed between the input and output ports is multiple of $\lambda$. If the diffractive elements 10 each comprise multiple diffracting regions 11 with the same angular period $\Delta\phi$ and angular width $\Delta\phi/2$, and the angular directions to the centers of the diffracting regions 11 of the additional diffractive elements 10 are shifted by $\Psi(n)=(n-1)\Delta\phi/N$ (n is the contour number, N=4 is the total number of contours in this example) with respect to the angular directions to the centers of the diffracting regions 11 of the first diffractive element 10, the portion of the optical signal routed by the four diffractive elements will have diffracted spatial maxima along the X-axis at locations $-x_0 \pm m\lambda/\Delta\phi$, where m=0, ±4, ±8, . . . (as shown in FIG. 13). Other diffracted spatial maxima are substantially suppressed.

Figure 14:
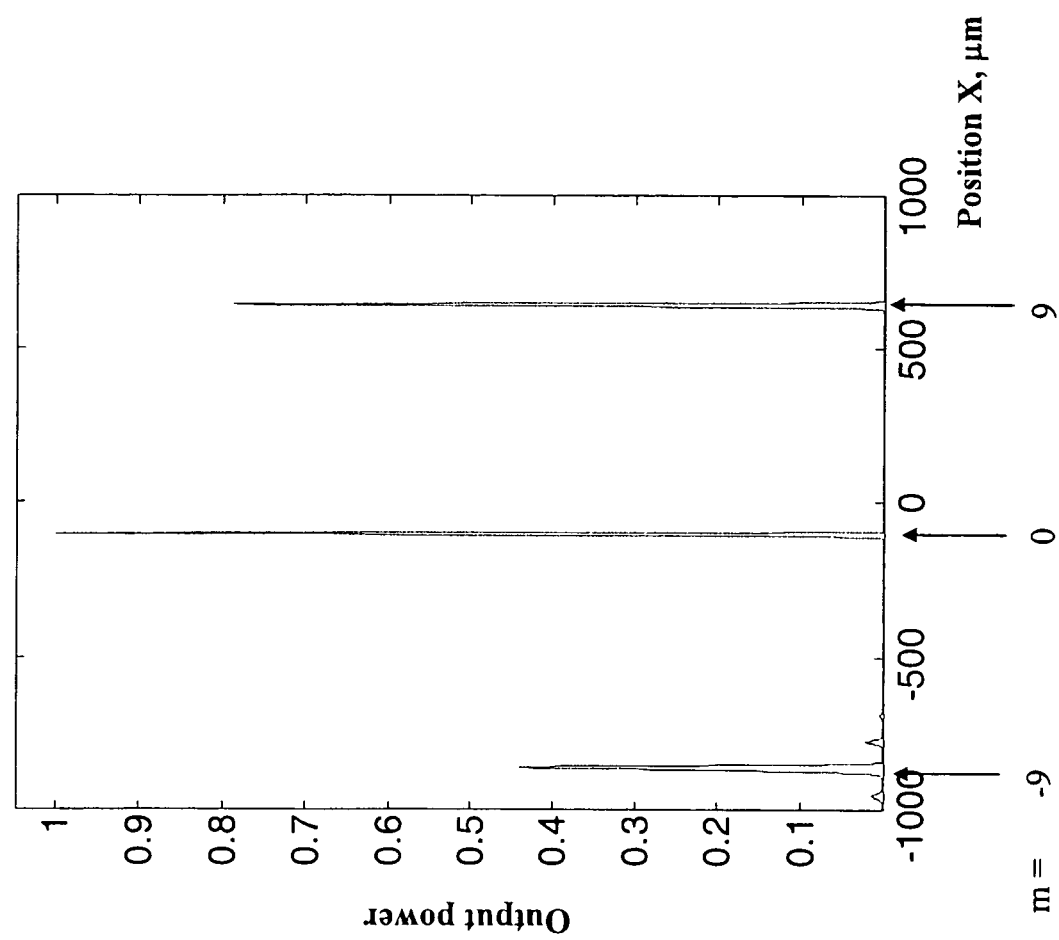
FIG. 14 illustrates schematically the spatial distribution of an optical field diffracted from a diffractive structure.

FIG. 14 shows simulation results analogous to those described hereinabove for a set of nine diffractive elements, with diffracted spatial maxima corresponding to m=0, ±9, ±18, and so on.

Figure 15:
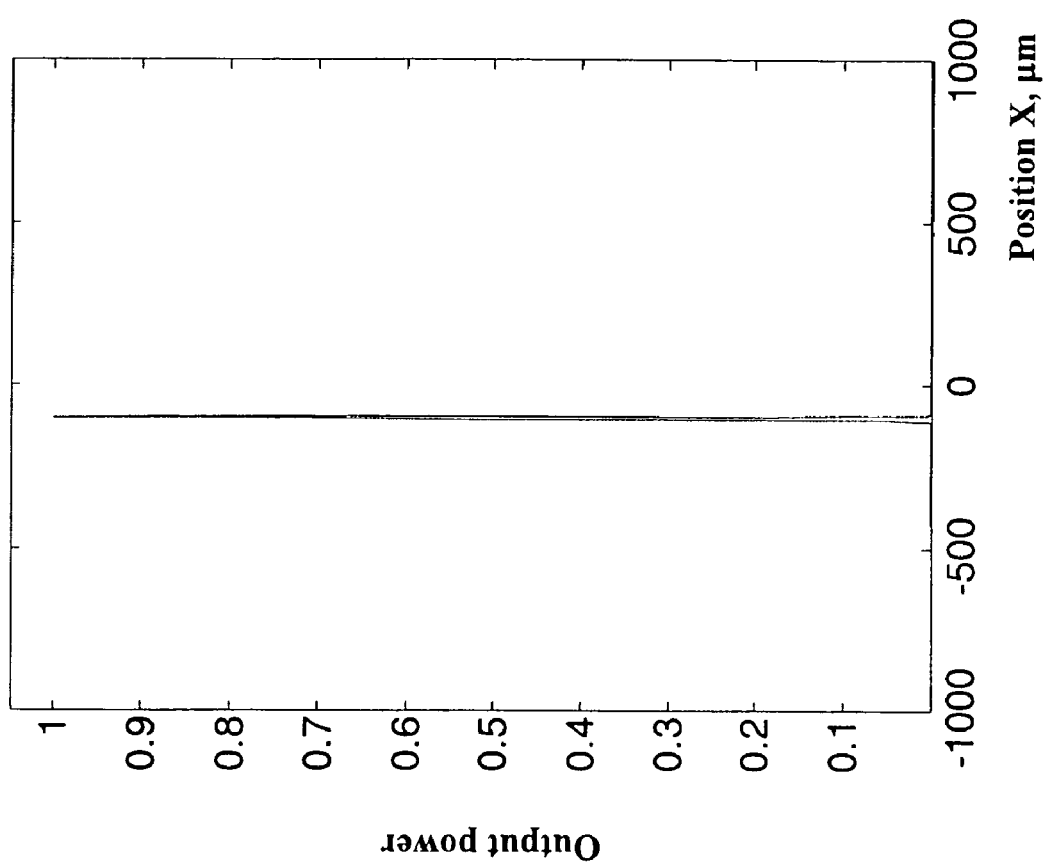
FIG. 15 illustrates schematically the spatial distribution of an optical field diffracted from a diffractive structure.

More generally, $\Psi$ may exhibit various dependencies on n, including random, while resulting in operationally acceptable suppression of the secondary spatial diffractive maxima that might otherwise arise from transverse interleaving of spatial regions. For example, FIG. 15 shows a numerical simulation for the case of N=128 and $\Psi(n)=(n-1)*0.0009$. The value of $\Psi(n)$ in the last expression is not equal to the value that would have been obtained by application of the formula given in the discussion of FIG. 12. FIG. 15 shows good suppression of the secondary spatial diffractive maxima.

Note that much of the optical power in the diffracted spatial maxima are located within an angular envelope with lateral (transverse) width along X-axis of approximately $\lambda/\Delta\phi$, substantially determined by the diffractive angle from an individual diffracting regions 11. This behavior is typical of many diffractive structures. From the above discussion, it follows that secondary diffracted maxima within the diffraction envelope width $\lambda/\Delta\phi$ can be more and more completely suppressed as one increases the value of N while ensuring that $\Psi$ varies by at least $\pi$ over the N contours. $\Psi$ may vary by less than $\pi$ over the N contours provided that the increased cross-talk and/or insertion loss may be tolerated (i.e., is operationally acceptable). The operationally acceptable level of suppression is typically defined by desired operational characteristics of the device. For example, a dense wavelength division multiplexer may require channel isolation and return loss of better than 35 dB. In that case, the suppression of the additional diffracted spatial maxima should be at this level or at a higher level. The essential approach to suppressing secondary diffractive maxima is to configure angularly (i.e., along the transverse dimension) the various diffractive elements, or analogously the multiple spatial regions of an interleaved primitive diffractive element set, so that their contributions to secondary maxima span a wide enough range of relative phases to provide an operationally acceptable degree of suppression. It should be noted that such transverse positioning of spatial regions of an interleaved primitive diffractive element set may be in addition to positioning along the propagation direction required to yield desired spectral characteristics for the routed portion of the optical signal.

Figure 16:
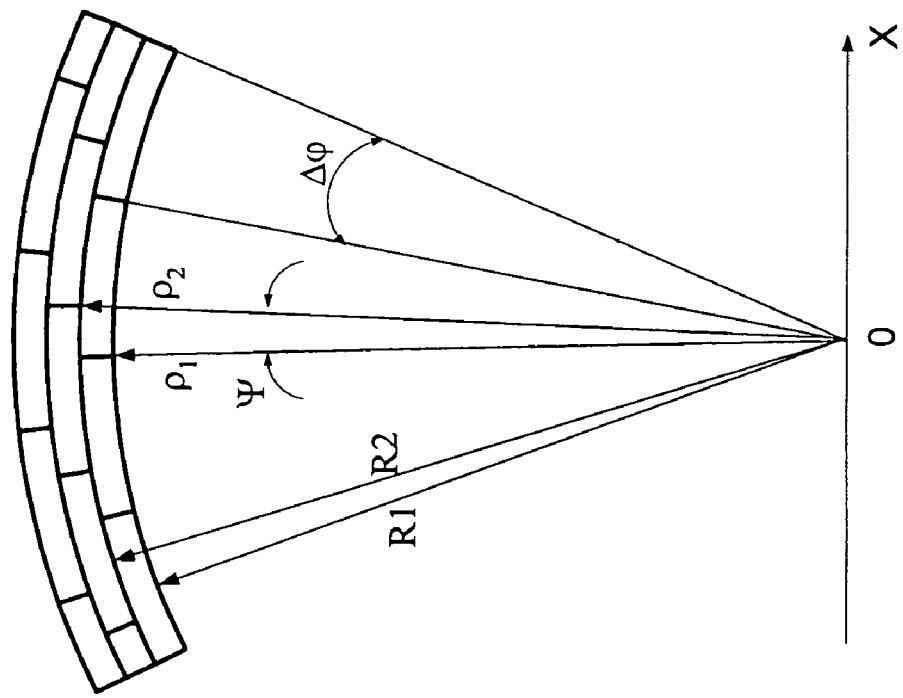
FIG. 16 illustrates schematically diffractive element sets interleaved in an optical device.

The above discussion provides an understanding of one possible way in which multiple different primitive diffractive element sets might be interleaved so as to substantially suppress secondary spatial diffractive maxima. As shown in the exemplary embodiment of FIG. 16, the space where the primitive diffractive element sets are interleaved is divided into spatial regions. The spatial regions are bounded by circular arcs of radii $R_i$ drawn from a common center of curvature located at the origin of coordinates with the x-axis running horizontally as shown in FIG. 16 and the y-axis running vertical. For simplicity only, the depth along the propagation direction of the spatial regions $(R_{i+1}-R_i)$ is set equal to a constant $\Delta\rho$, and each spatial region subtends an angle $\Delta\phi$ about the common center of curvature. The spatial regions within each radial band may be angularly shifted relative to the first band by a distribution of angular shifts $\Psi(n)$ in a manner analogous to the discussion of the diffractive element of FIGS. 10–15). The pattern of spatial regions with angular offsets $\Psi(n)$ may be employed as a template for the interleaving of multiple primitive diffractive element sets. One exemplary method of utilizing such a template to interleave P primitive diffractive element sets may include allocation of an angularly consecutive series of spatial regions within one radial band of spatial regions successively to the 1 . . . P primitive diffractive element sets to be interleaved. The radial band of spatial regions is filled out by repeating the allocation of 1 . . . P primitive diffractive element sets throughout the angular extent of the radial band until all available spatial regions are filled. Successive radial bands may be allocated according to the same method. Alternatively, more complex allocations of the spatial regions among the primitive diffractive element sets may be employed. The unifying principle employed is to define and allocate radial bands of spatial regions to the interleaved primitive diffractive element sets so that undesired spatial diffracted maxima are substantially suppressed through the dispersal of relative diffractive phase among contributing diffractive spatial regions.

When interleaving spatial regions of multiple primitive diffractive element sets, it may be beneficial or necessary to take into account the minimum distance between two features allowed by the fabrication process, in order to avoid uncontrolled fabrication effects. Such minimum distance ("minimum gap") may be defined by limitations of a lithographic process, or may be a requirement of efficient material filling of etched features, or may arise in some other way. A convenient approach to avoiding lithographic interference between spatial regions is to separate the spatial regions along their borders by a distance set to a small multiple of the lithographic resolution distance.

The spatial regions of interleaved primitive diffractive element sets may be made sufficiently small so as to substantially uniformly sample the incident optical signal in the transverse dimension(s). Transverse angular size of the spatial regions of about 10% of the total angular width of the incident optical signal beam may typically be employed, but other larger or smaller values may be employed as well. For larger spatial regions, additional design considerations may be needed or desired to efficiently sample and diffract the entire incident optical signal beam. Along the propagation direction (i.e., the depth dimension), the interleaved substructures may have a length equal to one-quarter of the in-medium wavelength (corresponding to a single diffractive element) up to tens, hundreds, or more of in-medium wavelengths. The length of interleaved substructures along the propagation direction may be set so as to provide a desired spectral transfer function and so as to provide adequate numbers of spatial regions so that their controlled spatial positioning allows for operationally acceptable suppression of optical signal diffracted into unwanted output directions.

Set forth hereinbelow are additional examples of interleaved primitive diffractive element sets adapted for suppression of undesirable spectral and/or spatial characteristics of the corresponding routed portions of the incident optical signal by irregular or deterministic arrangement of the spatial regions for the interleaved primitive diffractive element sets. The following exemplary embodiments include two interleaved primitive diffractive element sets; the same types of arrangements of the spatial regions equally applicable to an arbitrary number of interleaved primitive diffractive element sets within a single spatial region of an optical element. The present disclosure and appended claims are also intended to encompass cases wherein two or more interleaving methods are used together in the same optical apparatus.

In the following exemplary embodiments, the two primitive diffractive element sets have at least a common input port or output port. More generally, interleaved primitive diffractive element sets may have wholly separate corresponding input and output ports. The portion of the optical element where both primitive diffractive element sets interact with corresponding incident optical signals propagating from the input optical port(s) is divided into spatial regions, and these spatial regions are allocated for either one or the other of the primitive diffractive element sets according to principles discussed below. Interleaving of primitive diffractive element sets may reduce the reflectivity of each set compared to the case when it occupies the entire interaction area of the optical element, which may in some circumstance be regarded as a required trade-off for increased spectral resolution for multiple primitive diffractive element sets formed in a common optical apparatus without substantially increasing the size of the optical element.

Figure 17:
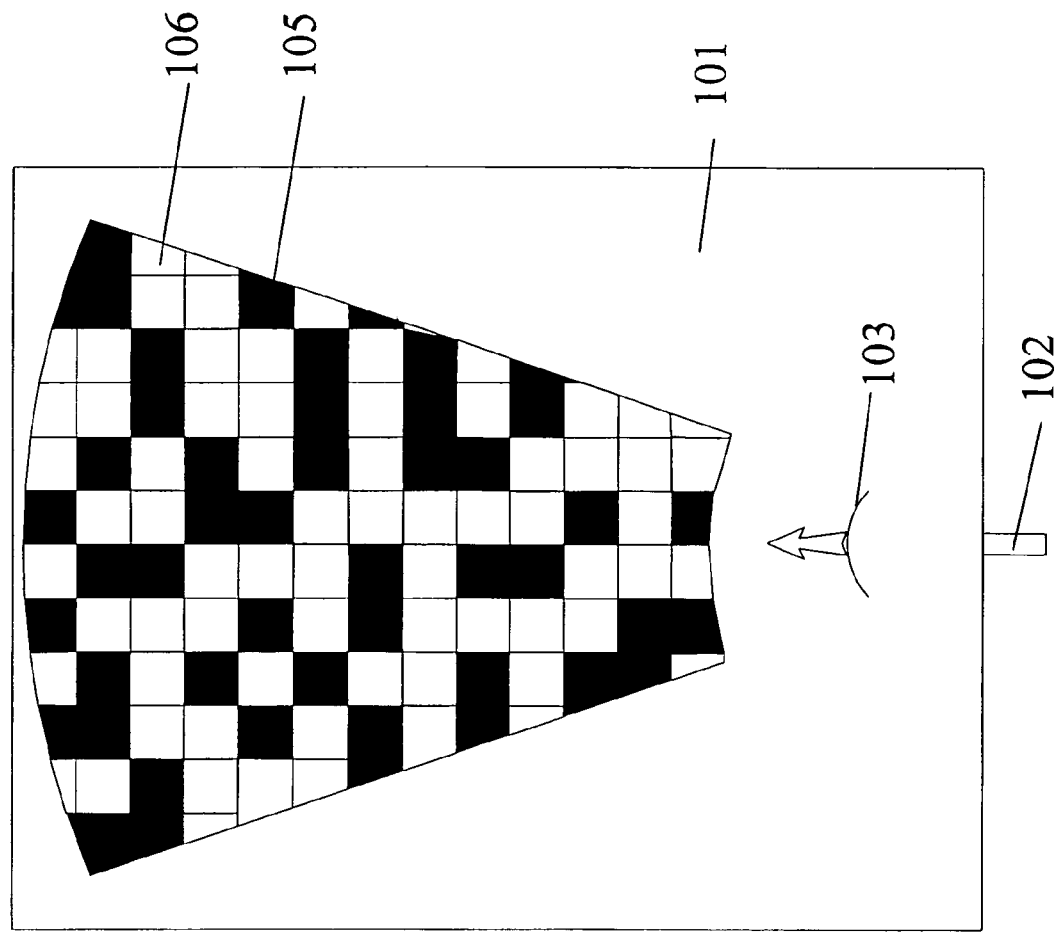
FIG. 17 illustrates schematically diffractive element sets interleaved in an optical device.

In the exemplary embodiment of FIG. 17, the interleaving area of optical element 101 is divided into space-filling or non-space filling spatial regions that may be regular or irregular in shape (in FIG. 17, square regions are shown). Each spatial region is randomly assigned to include diffracting regions of a first primitive diffractive element set (spatial regions 105, shown in black, as in the succeeding Figures), or to include diffracting regions of a second primitive diffractive element set (spatial regions 106, shown in white, as in the succeeding Figures). Since the resultant spatial arrangement of the spatial regions is random, there is only limited constructive interference that would result in additional (and potentially undesirable) spatial or spectral maxima in the corresponding routed portions of optical signal(s) 103 incident from optical port 102.

Figure 18:
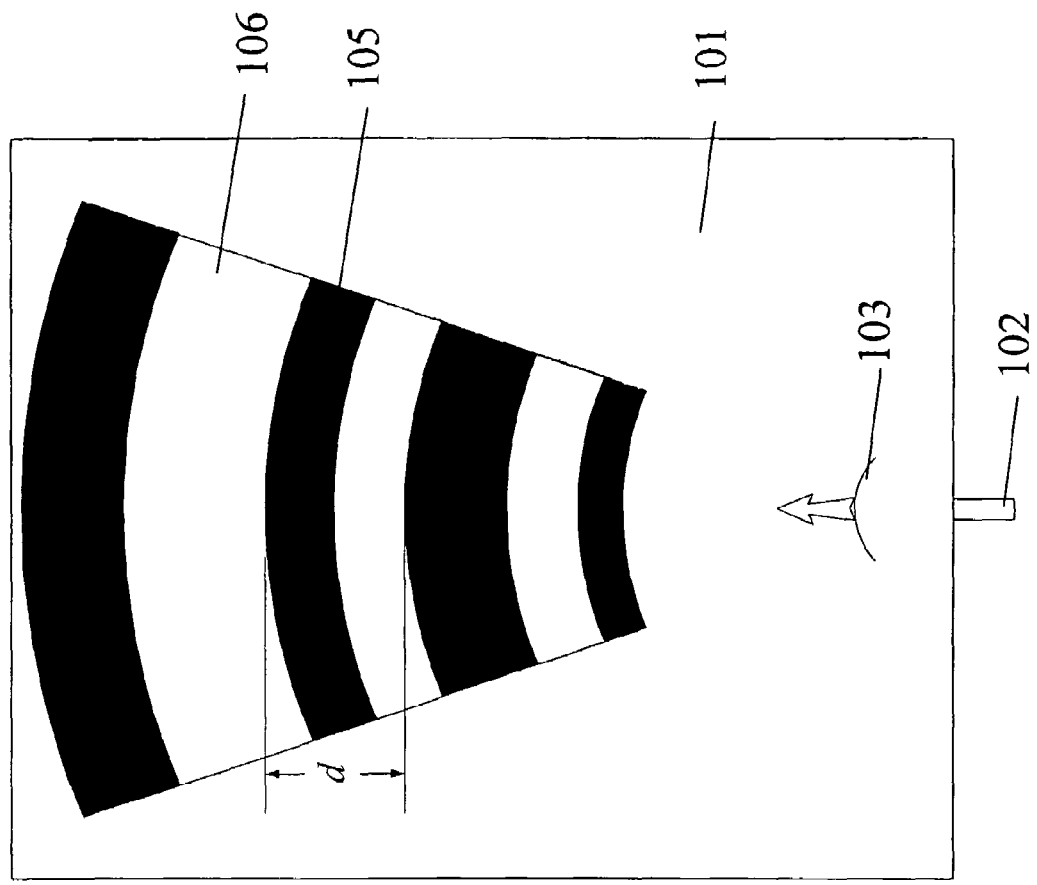
FIG. 18 illustrates schematically diffractive element sets interleaved in an optical device.

In the exemplary embodiment of FIG. 18, the interleaving area of optical element 101 is divided into space-filling or non-space-filling spatial regions of an arbitrary shape (in FIG. 18, arc-shaped segments are shown) in a substantially periodic or aperiodic arrangement along the propagation direction, and with each spatial region substantially spanning the entire incident optical signal 103 (aperiodic arrangement shown in FIG. 18). The aperiodic spacing d of the spatial regions may vary along the propagation direction following a random, linear, or other dependence, with any suitable arrangement resulting in reduction of periodicity and a concomitant reduction of undesirable spectral characteristics in the routed portion of the optical signal. Alternatively, an arrangement similar to that of FIG. 18 may be employed in which the spatial regions are arranged periodically along the propagation direction. A substantially periodic arrangement (i.e., a substantially constant spacing d) may be chosen, if desired, so that the resulting additional spectral diffracted maxima lie substantially outside a desired operational spectral range for the optical apparatus. Or if additional diffracted spectral maxima are of no concern, any value of d may be chosen.

A special case of the embodiment of FIG. 18 comprises primitive diffractive element sets which are "stacked". In this case, each primitive diffractive element set occupies only a single spatial region, and the incident optical signal 103 is successively incident on the spatial regions, and therefore also successively incident on the primitive diffractive element sets as well.

Figure 20:
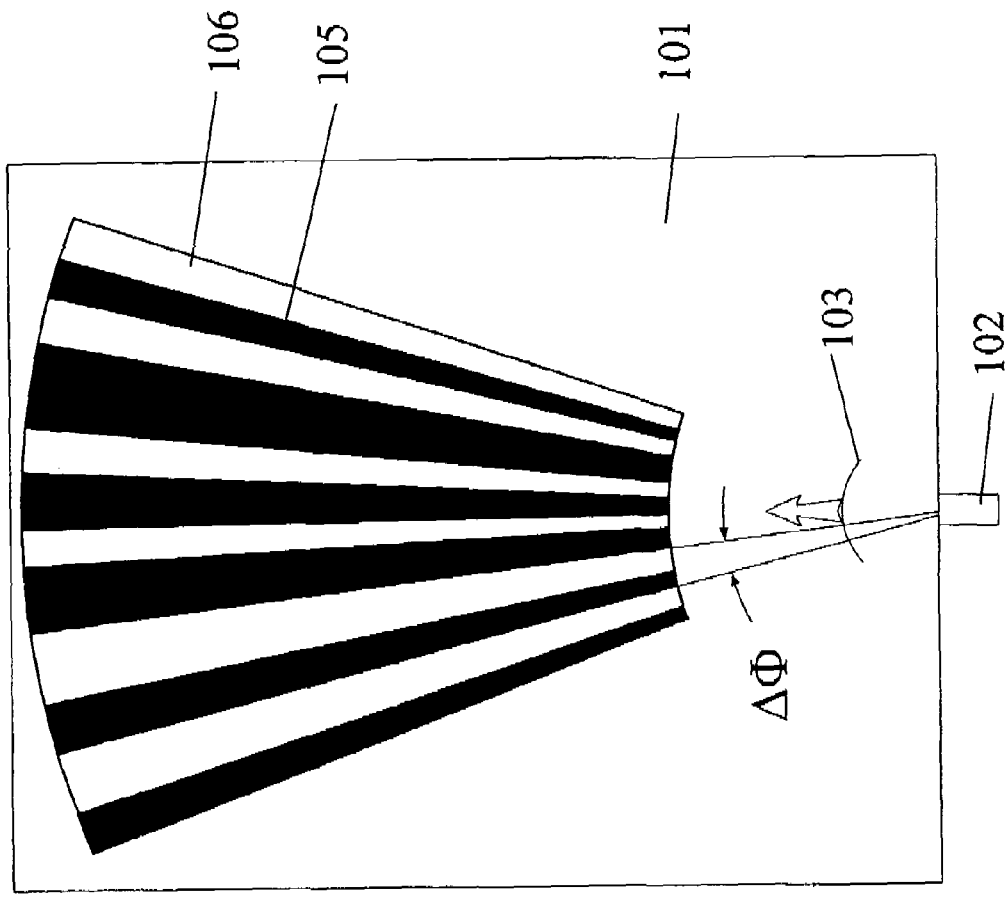
FIG. 20 illustrates schematically diffractive element sets interleaved in an optical device.

In the exemplary embodiment of FIG. 20, the interleaving area of optical element 101 is divided into space-filling or non-space-filling spatial regions of an arbitrary shape (in the FIG. 20, radial segments are shown) arranged periodically or aperiodically in the transverse direction (aperiodic shown in FIG. 20). Each portion of the spatial wavefront of incident optical signal 103 only encounters a single spatial region in this example. The aperiodic transverse angular width, $\Delta\Phi$, may vary from spatial region to spatial region following a random, linear, or other dependence, so as to result in a reduction in extraneous spatial diffractive characteristics. If additional spatial maxima are of no concern or may be shifted sufficiently so as to substantially avoid the optical ports, $\Delta\Phi$ may be kept substantially constant (i.e., the arrangement in the transverse direction may be substantially periodic).

Figure 19:
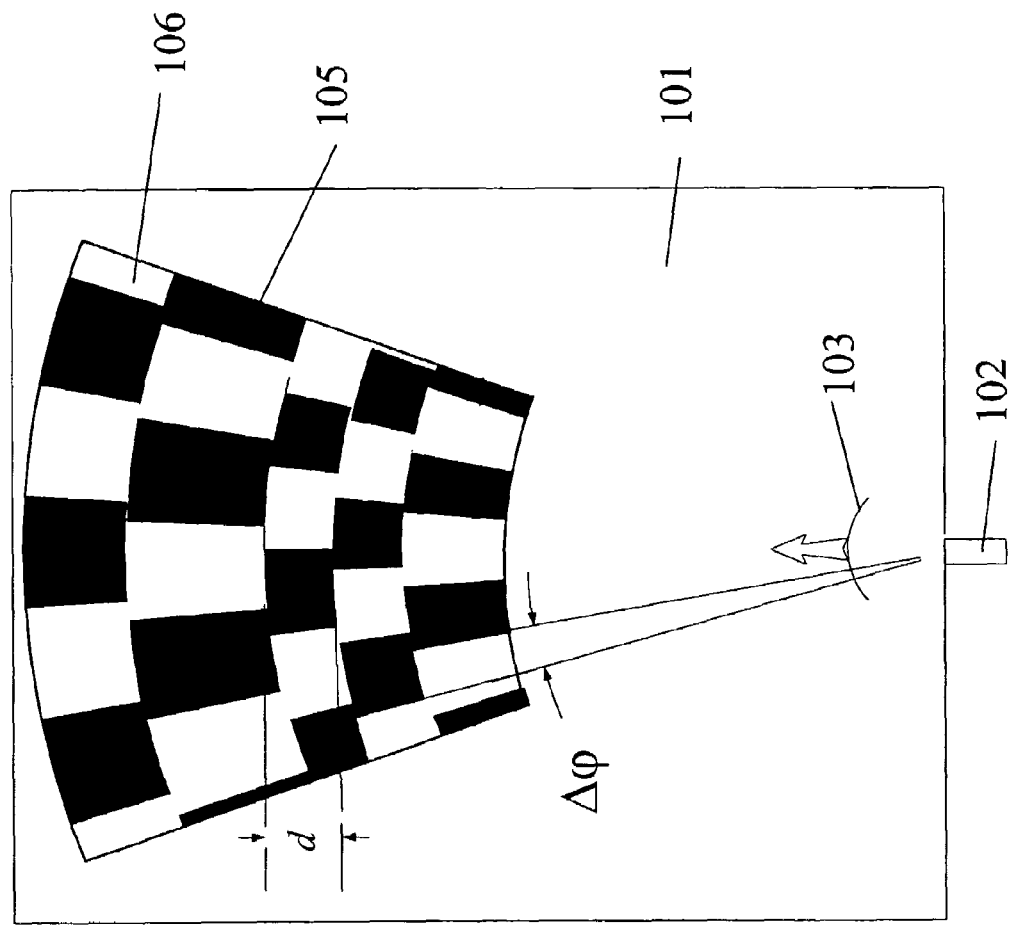
FIG. 19 illustrates schematically diffractive element sets interleaved in an optical device.

In the exemplary embodiment of FIG. 19, the interleaving area of optical element 101 is divided into space-filling or non-space-filling spatial regions of an arbitrary shape (in FIG. 19, arc-shaped segments are shown) arranged along both the propagation direction as well as the transverse direction. The spatial regions be arranged periodically or aperiodically along the propagation direction, and may be arranged periodically or aperiodically along the transverse direction (aperiodic arrangement in the propagation direction, period arrangement in the transverse direction, as shown in FIG. 19). Arrangement along the propagation direction may be implemented in any manner as discussed with respect to FIG. 18, while arrangement along the transverse direction may be implemented in any manner as discussed with respect to FIG. 20. Other arrangements that may be employed for reducing undesirable spatial characteristics of the routed portion of the optical signal may be motivated by the earlier discussion pertaining to FIGS. 6–15. In order to reduce additional diffractive spatial characteristics, each successive layer (in the propagation direction) of spatial regions may have the same angular width (i.e. the same periodicity in the transverse direction) while being shifted by an angle $\Delta\phi$ with respect to the common port relative to the preceding layer. $\Delta\phi$ may vary from spatial region layer to spatial region layer following a random, linear, or other dependence. If spatial maxima are of no concern or if they may be shifted so as to substantially avoid the optical ports, $\Delta\phi$ may be kept constant.

Figure 21:
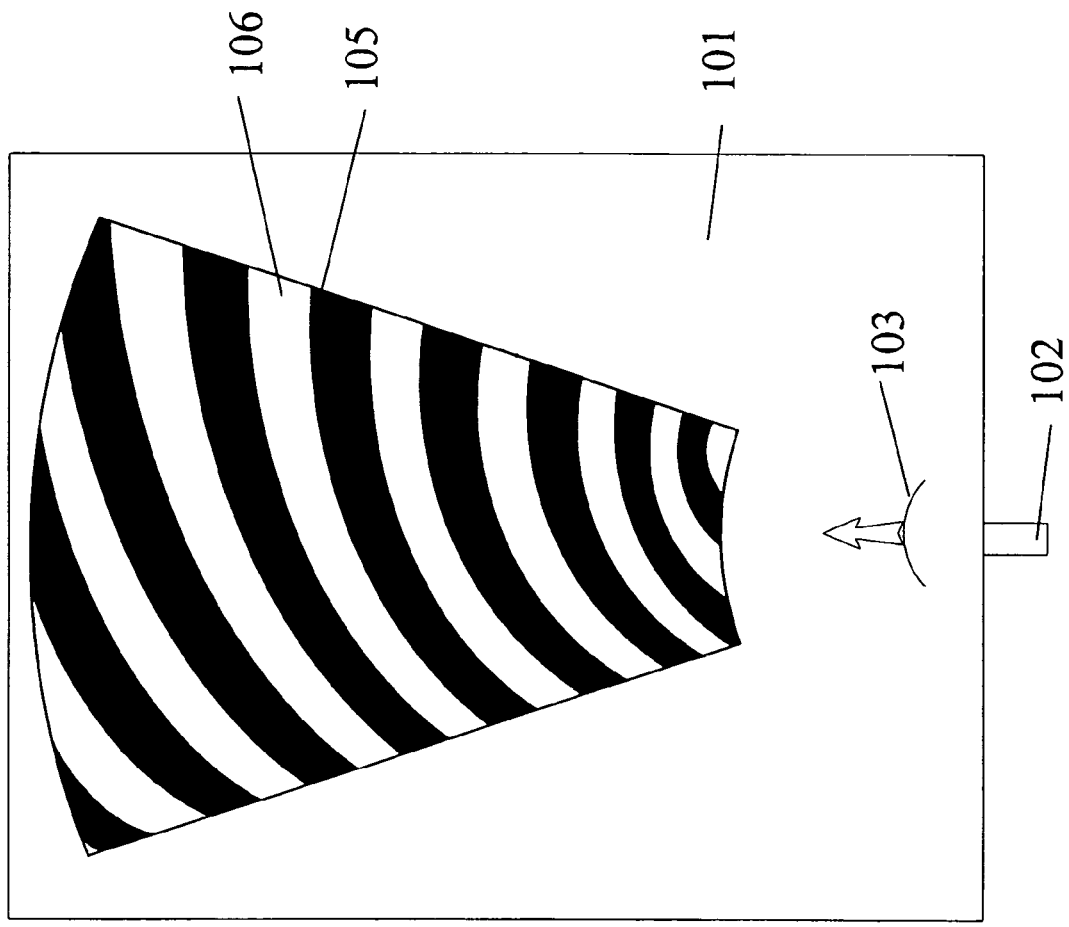
FIG. 21 illustrates schematically diffractive element sets interleaved in an optical device.

In the exemplary embodiment of FIG. 21, the interleaving area of optical element 101 is divided into space-filling or non-space-filling spatial regions of an arbitrary shape, including curvilinear and linear shapes (in the FIG. 21, curvilinear spatial regions are shown) which are arranged at an angle (constant or varying) with the propagation direction.

In the exemplary embodiments of FIGS. 19 and 20, the transverse arrangement of the spatial regions may affect the extent to which an incident optical signal interacts with a diffractive element set. If the incident optical signal is intended to interact with multiple diffractive element sets to a substantially equal extent, then the arrangement of spatial regions in the transverse direction for each diffractive element set must allow the diffractive element set to "sample" substantially the entire spatial wavefront of the incident optical signal. For example, this may be readily achieved through use of spatial regions sufficiently small (in the transverse direction), sufficiently numerous, and suitably distributed in the optical element so as to substantially uniformly sample the spatial wavefront of the incident optical signal. Fewer and larger spatial regions may be similarly employed with a suitably designed arrangement.

However, depending on the intended use of the optical device, it may be desirable in some circumstances to intentionally arrange spatial regions of different diffractive element sets to spatially sample the incident optical signal to differing extents. For example, a power splitter may be constructed in which spatial regions of two diffractive element sets each spatially sample the incident optical signal to differing extents, corresponding to the desired power splitting ratio. This and other optical device implementations wherein diffractive element sets spatially sample an incident optical signal to differing extents shall fall within the scope of the present disclosure and/or appended claims.

It should be noted that many of the embodiments depicted in this disclosure are only shown schematically, and that not all the features may be shown in full detail or in proper proportion and/or location. Certain features or structures may be exaggerated relative to others for clarity. In particular, it should be noted that the numbers of diffractive elements in an actual device may typically be larger than that shown in the Figures. The numbers of diffractive elements may be reduced in some Figures for clarity. In some Figures individual diffractive elements are not shown at all; spatial regions having diffracting regions of a particular diffractive element set are shown instead. It should be further noted that the embodiments shown in the Figures are exemplary only, and should not be construed as specifically limiting the scope of the written description or the claims set forth herein. It is intended that equivalents of the disclosed exemplary embodiments and methods shall fall within the scope of the present disclosure. It is intended that the disclosed exemplary embodiments and methods, and equivalents thereof, may be modified while remaining within the scope of the present disclosure.

For purposes of the present disclosure and appended claims, the conjunction "or" is to be construed inclusively (e.g., "a dog or a cat" would be interpreted as "a dog, or a cat, or both"), unless: i) it is explicitly stated otherwise, e.g., by use of "either . . . or", "only one of", or similar language; or ii) two or more of the listed alternatives are mutually exclusive within the particular context, in which case "or" would encompass only those combinations involving non-mutually-exclusive alternatives. It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure or appended claims.

What is claimed is:

1. An optical apparatus, comprising an optical element having at least two sets of diffractive elements, each diffractive element comprising at least one diffracting region thereof, wherein:
    at least one diffractive element set collectively routes, between a corresponding input optical port and a corresponding output optical port, at least a portion of a corresponding optical signal incident on the diffracting regions that is diffracted thereby as it propagates from the corresponding input optical port;
    the optical element includes at least one spatial region thereof wherein multiple diffracting regions of a first diffractive element set are present and diffracting regions of a second diffractive element set are absent; and
    the diffractive elements of each set, the diffracting regions thereof, and said spatial regions are arranged so as to impart desired spatial characteristics, desired spectral characteristics, or desired temporal characteristics onto the corresponding routed portion of the optical signal.

2. The apparatus of claim 1, wherein:
    the optical element includes at least one spatial region thereof wherein multiple diffracting regions of the first diffractive element set are present and diffracting regions of the second diffractive element set are absent;
    the optical element includes at least one spatial region thereof wherein multiple diffracting regions of the second diffractive element set are present and diffracting regions of the first diffractive element set are absent; and
    the diffractive elements of each set, the diffracting regions thereof, and said spatial regions are arranged so as to impart desired spatial characteristics, desired spectral characteristics, or desired temporal characteristics onto the corresponding routed portion of the optical signal.

3. The apparatus of claim 2, wherein the spatial regions are positioned and arranged so that a given portion of a spatial wavefront of an incident optical signal is incident on: i) at least one of the spatial regions having diffracting regions of the first diffractive element set; or ii) on at least one of the spatial regions having diffracting regions of the second diffractive element set.

4. The apparatus of claim 3, wherein the spatial regions are positioned and arranged so that a given portion of the spatial wavefront of the incident optical signal is successively incident on: i) at least one of the spatial regions having diffracting regions of the first diffractive element set; and ii) at least one of the spatial regions having diffracting regions of the second diffractive element set.

5. The apparatus of claim 4, wherein multiple spatial regions having diffracting regions of the first diffractive element set are positioned and arranged along a propagation direction of the incident optical signal so as to impart desired spectral characteristics or desired temporal characteristics onto the corresponding routed portion of the optical signal.

6. The apparatus of claim 5, wherein the multiple spatial regions having diffracting regions of the first diffractive element set are positioned and arranged periodically along the propagation direction of the incident optical signal, and the spatial period of the arrangement is chosen so that resultant undesirable spectral characteristics of the corresponding routed portion of the optical signal lie substantially outside a desired operational spectral range for the optical apparatus.

7. The apparatus of claim 5, wherein the multiple spatial regions having diffracting regions of the first diffractive element set are positioned and arranged aperiodically along the propagation direction of the incident optical signal, thereby reducing to an operationally acceptable level undesirable spectral characteristics of the corresponding routed portion of the optical signal within a desired operational spectral range for the optical apparatus.

8. The apparatus of claim 4, wherein the spatial regions are positioned and arranged so that each successively incident portion of the spatial wavefront of the incident optical signal is successively incident on a substantially similar sequence of spatial regions having diffracting regions of the first diffractive element set or diffracting regions of the second diffractive element set.

9. The apparatus of claim 8, wherein the sequence of spatial regions consists of one spatial region having diffracting regions of the first diffractive element set followed by one spatial region having diffracting regions of the second diffractive element set.

10. The apparatus of claim 4, wherein the spatial regions are positioned and arranged so that each successively incident portion of the spatial wavefront of the incident optical signal is successively incident on alternating spatial regions having diffracting regions of the first diffractive element set or diffracting regions of the second diffractive element set.

11. The apparatus of claim 3, wherein multiple spatial regions having diffracting regions of the first diffractive element set are positioned and arranged along a direction substantially transverse to the propagation direction of the incident optical signal so as to impart desired spatial characteristics onto the corresponding routed portion of the optical signal.

12. The apparatus of claim 11, wherein multiple spatial regions having diffracting regions of the first diffractive element set are positioned and arranged periodically along a direction substantially transverse to the propagation direction of the incident optical signal, and the spatial period of the arrangement is chosen so that resultant undesirable spatial characteristics of the corresponding routed portion of the optical signal substantially avoid optical ports of the optical apparatus.

13. The apparatus of claim 11, wherein multiple spatial regions having diffracting regions of the first diffractive element set are positioned and arranged periodically along a direction substantially transverse to the propagation direction of the incident optical signal, and sub-groups of the periodically-arranged spatial regions are transversely offset from one another so as to reduce at least one undesirable spatial characteristic of the corresponding routed portion of the optical signal to an operationally acceptable level.

14. The apparatus of claim 11, wherein the multiple spatial regions having diffracting regions of the first diffractive element set are positioned and arranged aperiodically along a direction substantially transverse to the propagation direction of the incident optical signal, thereby reducing to an operationally acceptable level undesirable spatial characteristics of the corresponding routed portion of the optical signal.

15. The apparatus of claim 3, wherein the spatial regions are positioned and arranged so that a given portion of the spatial wavefront of the incident optical signal is incident on either: i) at least one spatial region having diffracting regions of the first diffractive element set; or ii) at least one spatial region having diffracting regions of the second diffractive element set.

16. The apparatus of claim 2, wherein each diffractive element set collectively routes, between a corresponding input optical port and a corresponding output optical port, at least a portion of a corresponding optical signal incident on the diffracting regions that is diffracted thereby as it propagates from the corresponding input optical port.

17. The apparatus of claim 2, wherein:
the first diffractive element set collectively routes, between a first input optical port and a first output optical port, at least a portion of the corresponding optical signal incident on the diffracting regions that is diffracted thereby as it propagates from the first input optical port;

the second diffractive element set leaves substantially undisturbed the optical signal propagating from the first input optical port and the routed portion of the incident optical signal as it propagates to the first output optical port; and the diffracting regions of the second diffractive element set are arranged so as to yield an effective refractive index for optical signals propagating in the optical element that remains within an operationally acceptable range over the spatial regions of the optical element.

18. The apparatus of claim 1, wherein the optical element comprises a slab optical waveguide substantially confining in one transverse spatial dimension optical signals propagating in two other spatial dimensions therein.

19. The apparatus of claim 18, wherein each diffractive element of each diffractive element set is spatially defined with respect to one of a corresponding set of linear or curvilinear diffractive element virtual contours, and the spatial region comprises an areal spatial region of the slab waveguide.

20. The apparatus of claim 19, wherein at least one areal region is bounded in part by a propagation path of a given portion of a spatial wavefront of the corresponding incident optical signal.

21. The apparatus of claim 19, wherein at least one areal region is bounded in part by one of the diffractive element virtual contours of the corresponding diffractive element set.

22. The apparatus of claim 1, wherein the optical element enables propagation of optical signals in three spatial dimensions therein.

23. The apparatus of claim 22, wherein each diffractive element of each diffractive element set is spatially defined with respect to one of a corresponding set of areal diffractive element virtual contours, and the spatial region comprises a volume spatial region within the optical element.

24. The apparatus of claim 23, wherein at least one volume spatial region is bounded in part by one of the areal diffractive element virtual contours of the corresponding diffractive element set.

25. The apparatus of claim 23, wherein at least one volume spatial region is bounded in part by a propagation path of a given portion of a spatial wavefront of the corresponding incident optical signal.

26. The apparatus of claim 1, wherein the optical element comprises a channel optical waveguide substantially confining in two transverse spatial dimensions optical signals propagating in one other spatial dimension therein.

27. The apparatus of claim 26, wherein the spatial region comprises a linear segment of the channel waveguide.

28. The apparatus of claim 1, wherein the optical signal propagating from the corresponding input optical port is sequentially incident on diffractive elements of the corresponding diffractive element set.

* * * * *